(12) United States Patent
Kashiwagi

(10) Patent No.: US 8,449,166 B2
(45) Date of Patent: May 28, 2013

(54) IMAGE SOURCE UNIT AND DISPLAY DEVICE INCLUDING THE SAME

(75) Inventor: Tsuyoshi Kashiwagi, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 456 days.

(21) Appl. No.: 12/976,033

(22) Filed: Dec. 22, 2010

(65) Prior Publication Data

US 2011/0164205 A1    Jul. 7, 2011

(30) Foreign Application Priority Data

Dec. 25, 2009   (JP) ................ 2009-294716

(51) Int. Cl.
*F21V 8/00*   (2006.01)
*G03B 21/56*  (2006.01)

(52) U.S. Cl.
USPC ............. 362/627; 362/19; 362/561; 362/617; 359/613

(58) Field of Classification Search
USPC ........ 362/19, 617, 627, 561; 445/24; 359/613
See application file for complete search history.

(56) References Cited

U.S. PATENT DOCUMENTS

| | | | | |
|---|---|---|---|---|
| 6,822,792 | B2* | 11/2004 | Goto ............................. | 359/456 |
| 7,686,463 | B2* | 3/2010 | Goto ............................. | 359/613 |
| 7,712,911 | B2* | 5/2010 | Yatsu et al. ................. | 362/97.1 |
| 7,889,289 | B2* | 2/2011 | Misono et al. ................ | 349/64 |
| 2011/0043542 | A1* | 2/2011 | Kashiwagi et al. .......... | 345/690 |
| 2011/0063873 | A1* | 3/2011 | Parker et al. ................. | 362/609 |

FOREIGN PATENT DOCUMENTS

JP    2003-066206 A    3/2003

* cited by examiner

*Primary Examiner* — Stephen F Husar
*Assistant Examiner* — James Cranson, Jr.
(74) *Attorney, Agent, or Firm* — Ladas & Parry LLP

(57) ABSTRACT

An image source unit that can efficiently provide image light emitted from an image source to an observer is disclosed. The image source unit includes an image source; and an optical sheet that disposed closer to an observer side than the image source. The optical sheet includes an optical functional layer that includes a light-transmitting portion having a trapezoidal cross section; and the low refractive-index portion having a wedge shape cross section. An oblique side of the wedge shape cross section of the low refractive-index portion form an angle of $\theta_b$ with respect to a normal line of the sheet surface.

13 Claims, 16 Drawing Sheets

IMAGE SOURCE UNIT AND DISPLAY DEVICE INCLUDING THE SAME

BACKGROUND OF THE INVENTION

1. Field of the Invention

The present invention relates to a display device such as a liquid crystal television and an image source unit that is used in the display device. More particularly, the invention relates to a display device and an image source unit that can efficiently emit light from an image source.

2. Description of the Related Art

A display device such as a liquid crystal television comprises an image source such as a liquid crystal panel that outputs an image to be displayed and an optical sheet that improves a quality of image light emitted from the image source and transmits the image light to an observer side. In order to provide a higher quality image to an observer, the optical sheet is generally configured by stacking layers having various functions.

An example of the conventional optical sheet is disclosed in Japanese Patent Application Laid-Open (JP-A) No. 2003-66206. According to this example, the optical sheet (two-dimensional viewing angle increasing member) comprises layers that have light-transmitting portions (unit lens portions) arranged along a sheet surface to transmit light and having a trapezoidal cross section, and light absorbing portions (portions between lenses) provided between the light-transmitting portions to absorb light and having a triangular cross section. By these layers, the image light can be reflected and provided to the observer and external light or stray light can be absorbed.

However, in the example that is disclosed in JP-A No. 2003-66206, an incident angle of light that is incident on the light absorbing portions is not controlled and the amount of image light that is absorbed by the light absorbing portions is not small.

SUMMARY OF THE INVENTION

Accordingly, an object of the present invention is to provide an image source unit that can efficiently provide image light emitted from an image source to an observer. The invention also provides a display device including the image source unit and a method for manufacturing the image source unit.

Hereinafter, the invention will be described.

The invention according to a first aspect is an image source unit comprising: an image source outputting an image; and an optical sheet disposed closer to an observer than the image source and having a plurality of layers to control light from the image source and transmit the light to the observer side, wherein the optical sheet comprises an optical functional layer comprising: a light-transmitting portion having a trapezoidal cross section, having a refractive index of $N_p$ and being arranged along a sheet face to transmit the light; and a low refractive-index portion having a wedge shape cross section, having a refractive index of $N_b$, and being arranged between the light-transmitting portions, and an oblique side of the wedge shape of the low refractive-index portion forms an angle of $\theta_b$ with respect to a normal line of the sheet face, and when a half-value angle of a divergence angle of image light from the image source is set to $\theta_0$ and a refractive index of air is set to $N_0$, $N_p > N_b$ and the following equation are satisfied.

$$\sin^{-1}\frac{N_b}{N_p} \leq 90° - \left\{\sin^{-1}\left(\frac{N_0}{N_p}\cdot\sin\theta_0\right) + \theta_b\right\}$$

In this case, the divergence angle and the half-value angle of the divergence angle are defined as shown in FIG. 16. That is, the divergence angle is a divergence angle (viewing angle) of the image light and the half-value angle of the divergence angle is an angle where the brightness is half the highest brightness (front brightness in this example).

The second aspect of the invention according to the first aspect of the invention is characterized in that the low refractive-index portions can absorb light.

The third aspect of the invention according to the second aspect of the invention is characterized in that a binder that is made of a resin having a refractive index of $N_b$ is filled into the low refractive-index portion, and light absorbing particles that have an average particle size of 1 μm or more are dispersed in the binder.

The fourth aspect of the invention according to any one of the first to third aspect of the invention is characterized in that the image source comprising: a light source; a light source-side polarizing plate disposed on a light emission side of the light source; a liquid crystal panel disposed on the observer side of the light source-side polarizing plate; and an observer-side polarizing plate disposed on the observer side of the liquid crystal panel, the observer-side polarizing plate comprising: a polarization layer; and protective layers arranged to sandwich the polarization layer, the optical functional layer of the optical sheet is laminated directly on a observer side surface of the protective layer of the observer-side polarizing plate, and the light-transmitting portions and the low refractive-index portions of the optical functional layer laminated directly on the surface of the protective layer extend while maintaining the cross sectional shape thereof, and an extension direction and a polarization direction of the observer-side polarizing plate are vertical to each other.

The fifth aspect of the invention according to any one of the first to fourth aspects of the invention is characterized in that the cross-sectional shape of the light-transmitting portion and the low refractive-index portion of the optical functional layer are approximately trapezoidal, and shorter upper bases of the light-transmitting portions and longer lower bases of the low refractive-index portions are direct to the observer side.

The sixth aspect of the invention according to any one of the first to fifth aspects of the invention is characterized in that the light-transmitting portions of the optical functional layer are formed of a composition that contains acrylate having a fluorene backbone.

The seventh aspect of the invention according to any one of the first to sixth aspects of the invention is characterized in that the difference of the refractive indices between the light-transmitting portions and the low refractive-index portions of the optical functional layer is 0.09 or more.

The eighth aspect of the invention according to any one of the first to seventh aspects of the invention is characterized in that the light-transmitting portion and the low refractive-index portion of the optical functional layer are formed to extend in a longitudinal direction while maintaining the cross sections thereof, the optical functional layer is by laminating two layers, and the two optical function layers are laminated such that a longitudinal direction of the low refractive-index portion of one optical functional layer and a longitudinal direction of the low refractive-index portion of the other optical functional layer form a certain angle.

The ninth aspect of the invention according to eighth aspects of the invention is characterized in that the certain angle is 90 degrees.

The tenth aspect of the invention according to any one of the first to third aspects of the invention is characterized in that the low refractive-index portions of the optical functional layer are formed in a lattice shape to cross each other at a certain angle.

The eleventh aspect of the invention according to tenth aspects of the invention is characterized in that the certain angle is 90 degrees.

The invention according to a twelfth aspect is a display device comprising the image source unit of any one of the first to eleventh aspects.

The invention according to a thirteenth aspect is a method of manufacturing the image source unit according the fourth aspect, comprising a process for forming the optical functional layer on the protective layer of the observer-side polarizing plate.

According to the invention, the image light can be efficiently reflected from the image source and provided to the observer side. Accordingly use efficiency of the image light can be improved.

DESCRIPTION OF MODES FOR CARRYING OUT THE INVENTION

Figure 1:
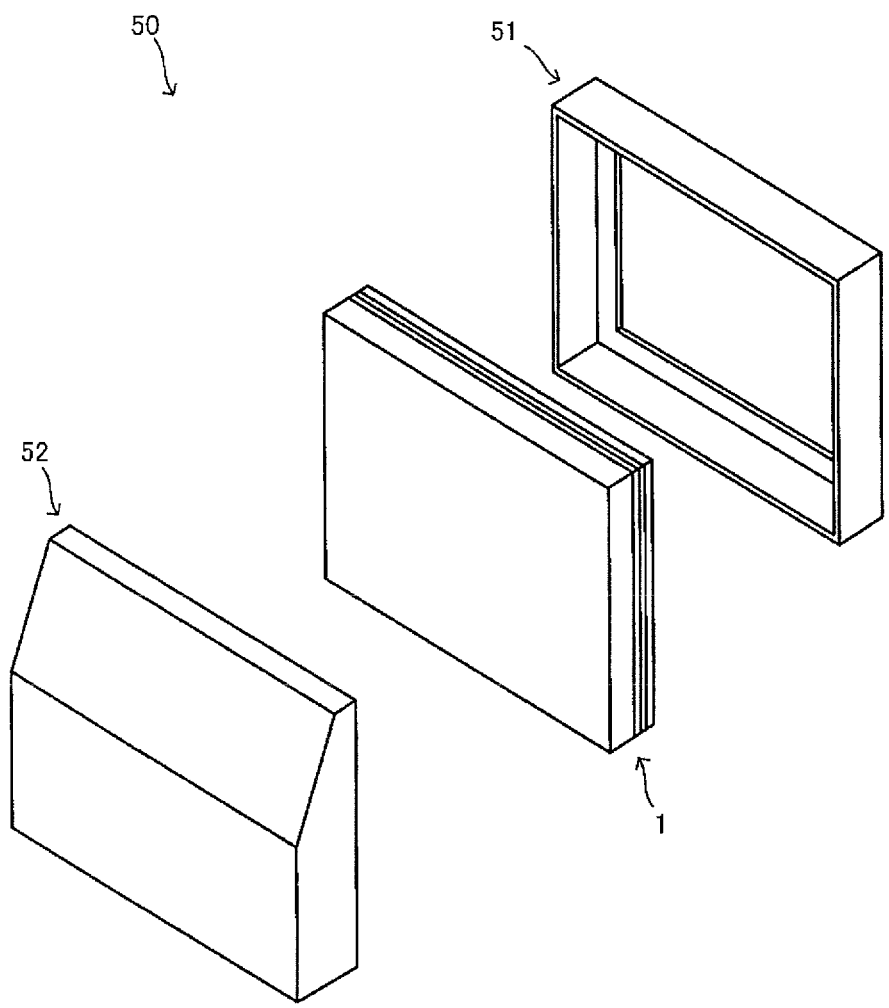
FIG. 1 is an exploded perspective view of a display device comprising an image source unit according to a first embodiment.

The aforementioned functions and benefits of the invention will be apparent from the following best modes for carrying out the invention. Hereinafter, the invention will be described based on embodiments shown in the drawings.

FIG. 1 is an exploded perspective view schematically showing a display device 50 that includes an image source unit 1 according to a first embodiment. In FIG. 1, the upper right side of the drawing is the observer side and the lower left side of the drawing is the back side. As can be seen from FIG. 1, the display device 50 includes the image source unit 1 at the inner side of a casing that is formed by a front-side casing 51 and a back-side casing 52. The display device 50 according to this embodiment is a liquid crystal display device and the image source unit 1 is a liquid crystal display panel unit. In the display device 50, in addition to the image source unit 1, known devices provided to a conventional display device are provided in the casing. Examples of such devices include various electric circuits and cooling means.

Figure 2:
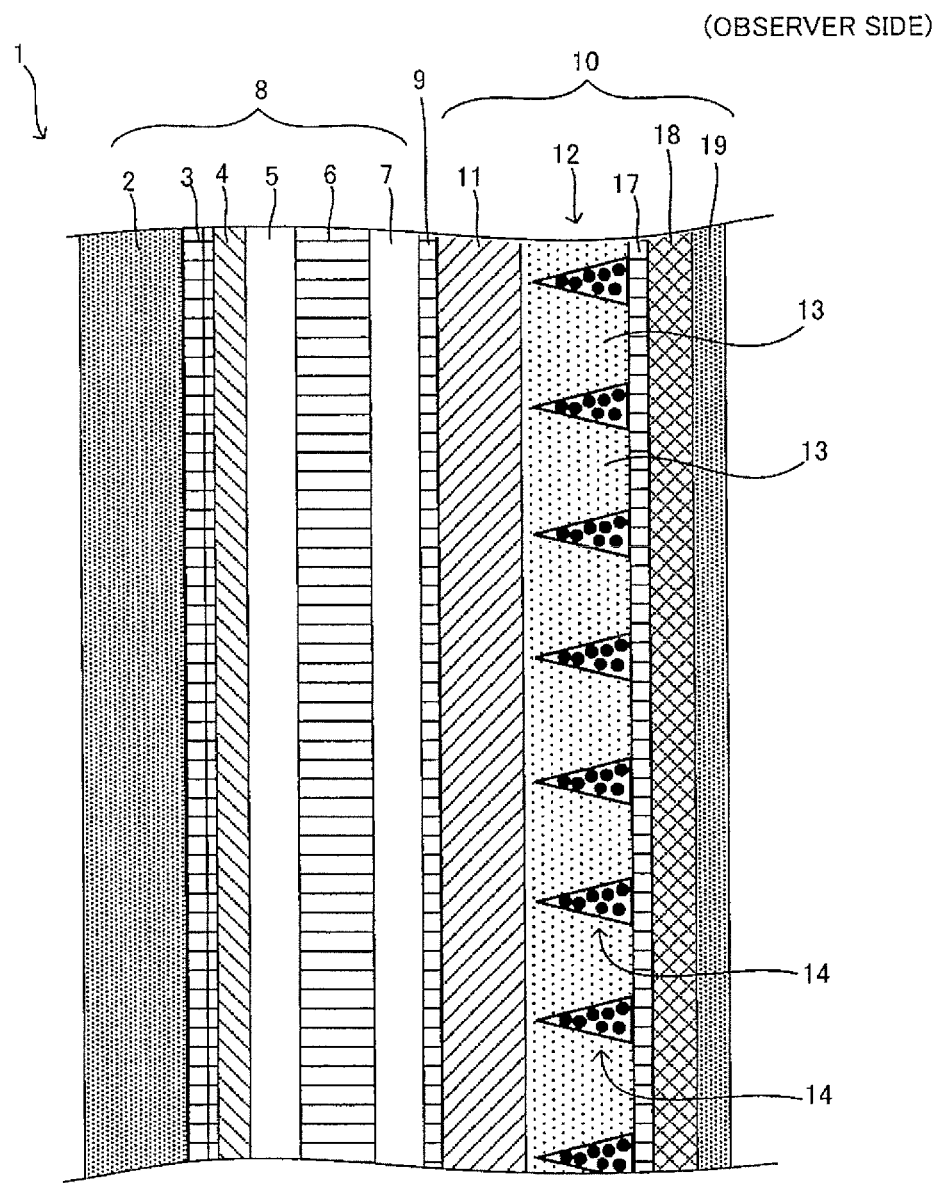
FIG. 2 is a cross-sectional view of the image source unit shown in FIG. 1 and shows a schematic layer structure thereof.

FIG. 2 is a cross-sectional view of the image source unit 1 shown in FIG. 1 and shows a schematic layer structure thereof. In FIG. 2, the right side of the drawing is the observer side.

The image source unit 1 comprises a backlight 2, prism sheet 3, an optical control sheet 4, a polarizing plate 5, a liquid crystal panel 6, a polarizing plate 7, an adhesive layer 9, and an optical sheet 10. These layers extend to the far/near side of the plane of paper while maintaining the cross-sectional shape shown in FIG. 2. Hereinafter, each layer will be described. In the drawings described below, some repeated reference numerals may be omitted for viewability.

The backlight 2 functions as a light source of the liquid crystal panel 6. In this case, a backlight that is used in a general liquid crystal display panel unit can be used as the backlight 2. For example, a planar light source in which a light emission source such as a light emitting diode (hereinafter, simply referred to as LED) or a cold cathode fluorescent lamp (hereinafter, simply referred to as CCFL) is approximately equally disposed to one surface of the prism sheet 3, or a light source of an edge input type in which the light emission source such as the LED or CCFL is disposed on the edge side of the prism sheet 3 and light is finally emitted in a planar shape using such as a light guiding plate may be used.

The prism sheet 3 is a sheet that condenses the light from the backlight 2 in a normal direction of the liquid crystal panel 6. In this case, as the prism sheet 3, a prism sheet used in a general liquid crystal display panel unit can be used. Depends on the shape of the prism sheets 3, the prism sheets 3 may be adhered directly or with a predetermined gap to the surface of the backlight 2 by an adhesive.

The optical control sheet 4 is a sheet that transmits only the light entering approximately in parallel with the normal direction of the panel face of the liquid crystal panel 6 among all light emitted from the backlight 2, or changes the direction of the light emitted from the backlight 2 to approximately parallel to the normal direction of the panel surface of the liquid crystal panel 6. That is, the optical control sheet 4 is a sheet having a function of decreasing a half-value angle of a divergence angle of the image light. Any sheet that has the above function may be used as the optical control sheet 4. According to this configuration, the incident light on the optical control sheet 4 from the light source side is emitted such that the incident direction shifts approximately parallel to a normal line of a sheet light emission surface. A specific example of the optical control sheet 4 is shown in FIGS. 3 and 4.

Figure 3:
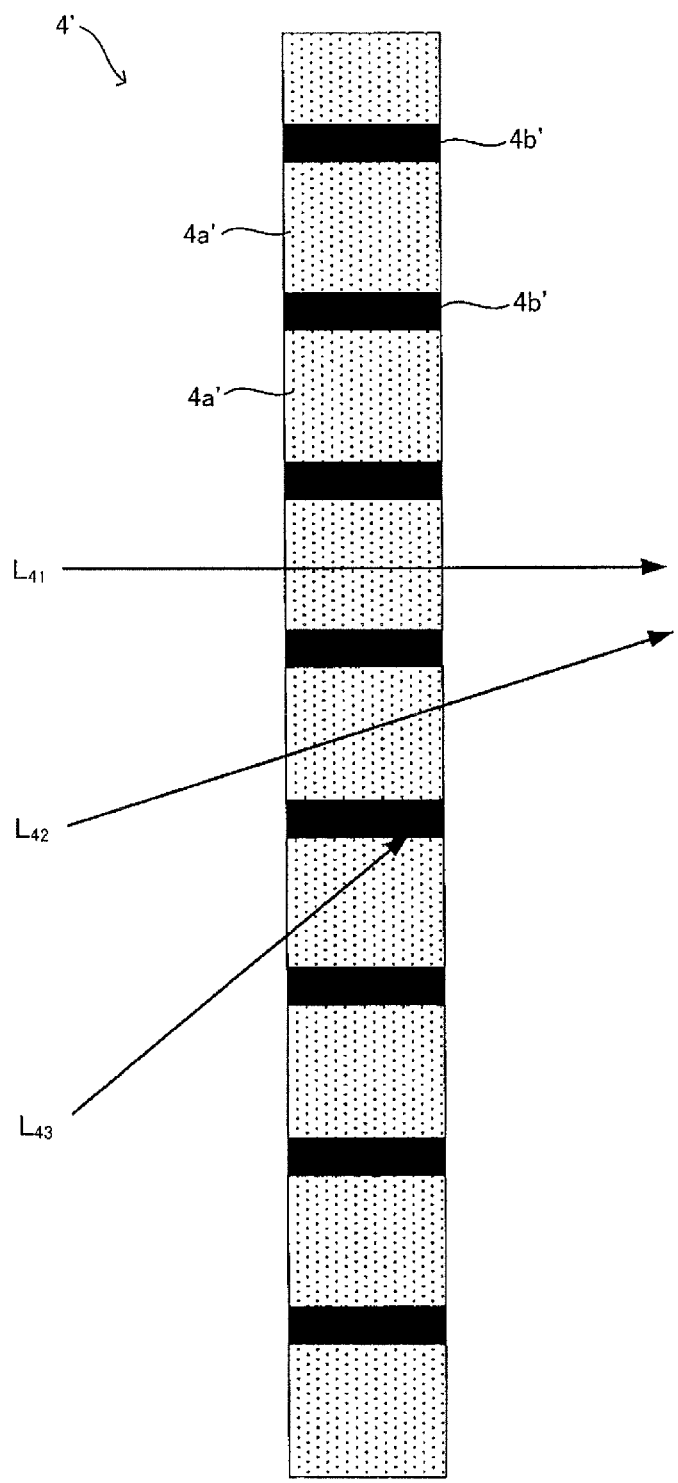
FIG. 3 is a diagram showing an example of an optical control sheet.
Figure 4:
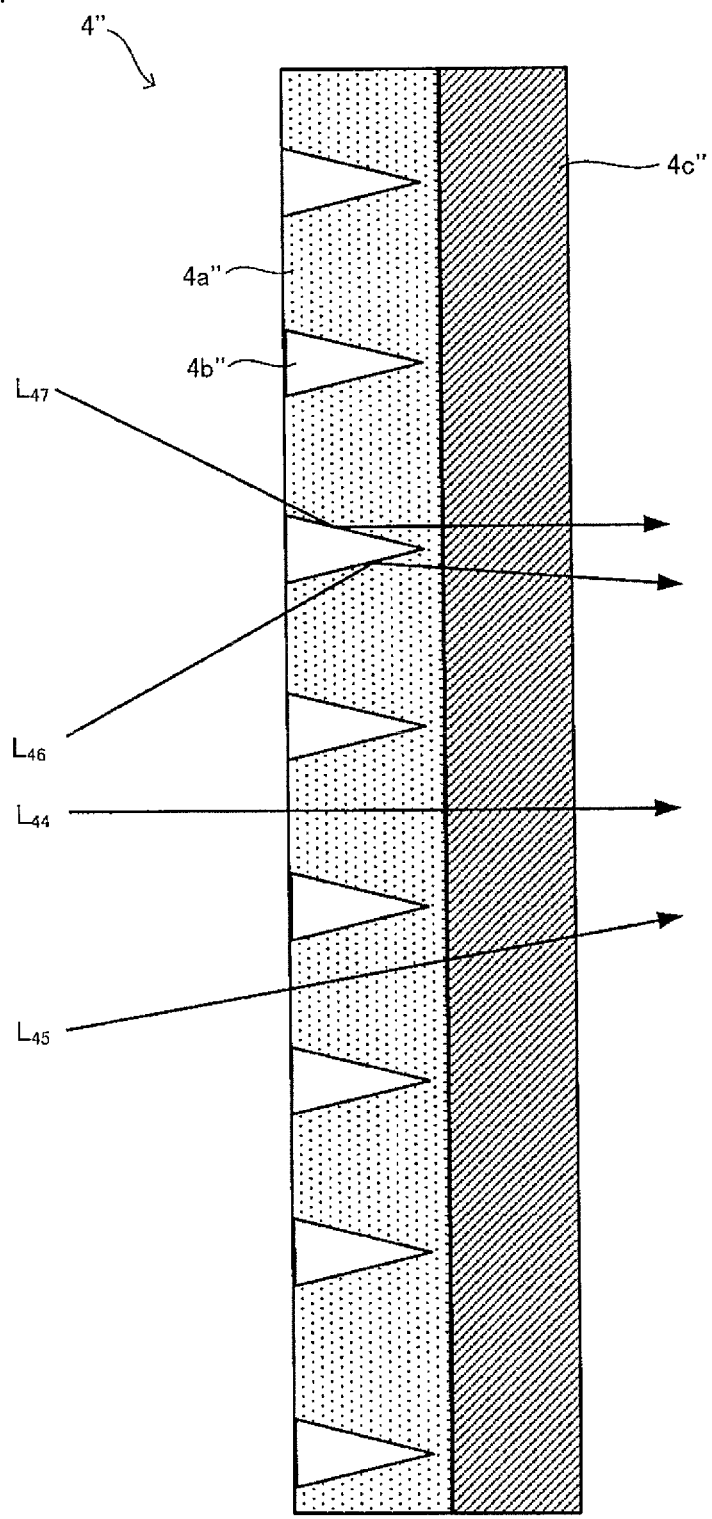
FIG. 4 is a diagram showing another example of the optical control sheet.

FIG. 3 is a cross-sectional view of an optical control sheet 4' that is an example of the optical control sheet 4. In FIG. 3, the right side of the drawing is the observer side and the optical control sheet 4' extends to the back/front side of the drawing while maintaining the cross-sectional shape shown in FIG. 3. In the cross section shown in FIG. 3, the optical control sheet 4' comprises rectangular light-transmitting portions 4a', 4a', . . . arranged along the sheet face at a certain interval in a light transmissive manner. The optical control sheet 4' also comprises rectangular-shaped light absorbing portions 4b', 4b', . . . provided between the light-transmitting portions 4a', 4a', . . . in a light absorbing manner.

According to the optical control sheet 4', as shown by optical path examples $L_{41}$ and $L_{42}$ in FIG. 3, the optical control sheet 4' can transmit light entering at a relatively small angle with respect to the normal line of the sheet surface. As shown by an optical path example $L_{43}$ in FIG. 3, the optical control sheet 4' can absorb light entering at a relatively large angle with respect to the normal line of the sheet surface. Thereby, the light emitted from the optical control sheet 4' is only from the direction that is approximately parallel to the normal line of the light emission surface of the sheet (normal line of the panel face of the liquid crystal panel 6).

The light-transmitting portions 4a' and the light absorbing portions 4b' of the optical control sheet 4' can be formed using known materials used in a field of optical sheets. A method of manufacturing the optical control sheet 4' is not limited in particular. The optical control sheet 4' can be manufactured using a known method. For example, a sheet-like member, which will be the light-transmitting portion 4a', and another sheet-like member, which will be the light absorbing portion 4b', are alternately laminated and then cut in the laminated direction with the predetermined thickness to obtain the optical control sheet 4'

FIG. 4 is a cross-sectional view of an optical control sheet 4" that is another example of the optical control sheet 4. In FIG. 4, the right side of the drawing is the observer side and the optical control sheet 4" extends to the back/front side of the drawing while maintaining the cross-sectional shape shown in FIG. 4. In the cross section shown in FIG. 4, the optical control sheet 4" comprises light-transmitting portions 4a", 4a", . . . , that are arranged along the sheet face at a predetermined interval in a light transmissive manner. The optical control sheet 4" further comprises light reflecting portions 4b", 4b" . . . provided between the light-transmitting portions 4a", 4a", . . . , which form an interface with the light-transmitting portions 4a", 4a", . . . to reflect light. The light-transmitting portions 4a", 4a", . . . are formed on a surface of a the light-transmissive base material 4c".

In this case, in the cross section shown in FIG. 4, the light-transmitting portion 4a" has a substantially trapezoid shape that has a shorter upper base at the light source side and a longer lower base at the observer side. Meanwhile, in the same cross section, the light reflecting portion 4b" has a triangular shape that has one base facing the light source side and an apex at the observer side.

According to the optical control sheet 4", as described above, the light can be reflected on the interface between the light-transmitting portion 4a" and the light reflecting portion 4b", and as can be seen from FIG. 4, the interface expands toward the observer side. Therefore, as shown by optical path examples $L_{44}$ and $L_{45}$ in FIG. 4, the light that does not reach the interface transmits the light-transmitting portion 4a" and a base material 4c" and then is emitted. The incident direction of such light is approximately in parallel with the normal direction of the light emission surface of the sheet.

Meanwhile, light shown by optical path examples $L_{46}$ and $L_{47}$ is incident at a large angle with respect to the normal direction of the light emission surface of the sheet. This light reaches the interface between the light-transmitting portion 4a" and the light reflecting portion 4b" and then is reflected on the interface. At this time, since the interface is inclined as described above, the direction of the reflected light becomes approximately in parallel with the normal direction of the light emission surface of the sheet, as can be seen from FIG. 4.

As seen above, according to the optical control sheet 4", not only the light that is incident approximately in parallel with the normal line of the light emission surface of the light (panel surface of the liquid crystal panel 6), by changing the direction of the light closer to a direction parallel to the normal line, but also the light that is incident at the large angle with respect to the normal line can be emitted. Therefore, a larger amount of light can be efficiently emitted.

The method for forming the reflection interface of the optical control sheet 4" is not limited in particular; a known means can be used. For example, the reflection interface can be formed by filling a material of which refractive index is lower than that of a material constituting the light-transmitting portion 4a" into the light reflecting portion 4b". In this case, the optical control sheet 4" can be manufactured in the same way as the optical functional layer 12 is manufactured, which will be described below. Additionally, a film, which can reflect light, may be formed on the inner surface of the light reflecting portion 4b" by using such as vapor deposition method.

The optical control sheet 4 may be adhered directly or with a certain gap to the surface of the prism sheet 3 by an adhesive.

The polarizing plates 5 and 7 are a pair of optical elements disposed to sandwich the liquid crystal panel 6. The polarizing plates 5 and 7 divide incident light into two polarization components (P wave and S wave) orthogonal to each other. The polarizing plates 5 and 7 transmit the polarization component (for example, P wave) of one direction (direction parallel to a transmission axis) while absorbing the polarization component (for example, S wave) of the other direction (direction parallel to an absorption axis) orthogonal to one direction. The light of the backlight 2 that is transmitted through the polarizing plates 5 and 7 and the liquid crystal panel 6 becomes image light and is emitted to the observer side.

In this case, the polarizing plate 5 disposed on the light source side may be adhered directly or with a certain gap to the optical control sheet 4 by the adhesive.

The liquid crystal panel 6 is one of elements that constitute the image source in the image source unit 1. On the liquid crystal panel 6, image information output from the image source is displayed. More specifically, in the liquid crystal panel 6, electric field may be applied to each region forming one pixel. And the alignment of the liquid crystal panel 6 where the electric field is applied is changed. The polarization component (for example, P wave) of a certain direction, which is transmitted through the polarizing plate 5 disposed on the light source side (that is, light incident side), rotates the polarization direction thereof by 90°, when the polarization component passes through the liquid crystal panel 6 where the electric field is applied, while it maintains the polarization direction thereof when the polarization component passes through the liquid crystal panel 6 where the electric field is not applied. Therefore, by switching electric field on and off, the polarization component (P wave) of a certain direction that is transmitted through the polarizing plate 5 can be controlled whether it transmits the polarizing plate 7 disposed on the light emission side of the polarizing plate 5 or is absorbed and blocked by the polarizing plate 7. Thus, transmission and blocking of the light emitted from the light source can be controlled on a pixel to pixel basis and an image can be displayed.

In this embodiment, the backlight 2, the prism sheet 3, the optical control sheet 4, the polarizing plate 5, the liquid crystal panel 6, and the polarizing plate 7 constitute the image source 8.

In this case, the image source 8 is described as one type of the image source. However, the other type of image source may be applied to the image source unit according to the invention and the display device using the image source unit. FIGS. 5A to 7 conceptually show image sources according to first to third modifications.

Figure 5A:
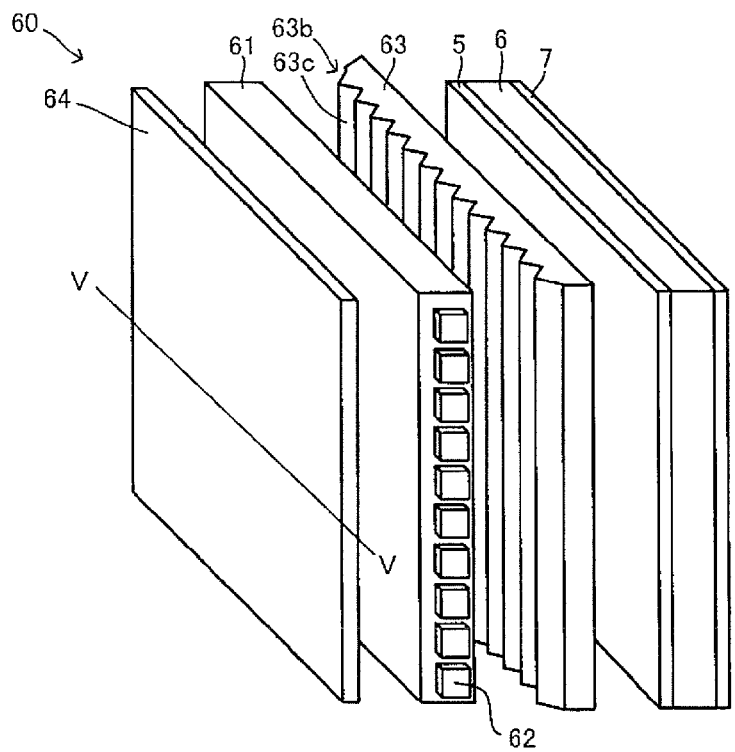
FIG. 5A is an exploded perspective view of an image source according to a first modification.
Figure 5B:
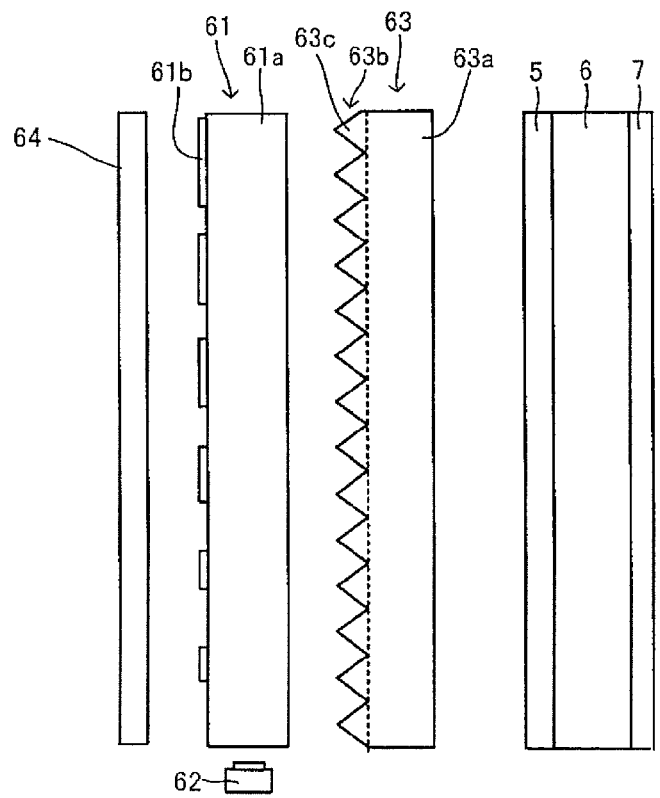
FIG. 5B is a cross-sectional view of the image source according to the first modification.

FIGS. 5A and 5B show an image source 60 according to the first modification. FIG. 5A is an exploded perspective view of the image source 60 and FIG. 5B is a cross-sectional view taken along the line V-V of FIG. 5A.

The image source 60 includes a surface light source device of an edge light type. The image source 60 includes a light guiding plate 61, a light source 62, a deflection sheet 63, a reflection sheet 64, polarizing plates 5 and 7, and a liquid crystal panel 6. Among them, since the polarizing plates 5 and 7 and the liquid crystal panel 6 are the same as those of the image source 8 described above, the same reference numerals are denoted and the description thereof is not repeated here.

The light guiding plate 61, which is a flat member as can be seen from FIG. 5B, comprises a light guiding portion 61a having a light-transmitting property and plural reflection dots 61b disposed on the light guiding portion 61a-side surface of the reflection sheet 64 in a certain form. The reflection dots 61b have a function of scattering and reflecting the incident light. As the light guiding plate, which provides the light guiding portion and the reflection dots, a known light guiding plate may be applied.

The light source 62 is disposed on, among two pairs of opposite sides of the light guiding plate 61, one side or both sides of a pair of opposite sides along which the below-described unit prisms 63b of the deflection sheet 63 extend. The light source is not limited in particular. The light source can be configured in various forms; for example, a fluorescent lamp such as a linear cold cathode tube, plural point-like LEDs (light emitting diodes), and an incandescent lamp can be used. In this embodiment, the light source 62 is configured by the plural LEDs; the output of each LED, which is turning-on/off and/or brightness of each LED, can be controlled independently from the other LEDs by a control device (not shown in the drawings).

Next, the deflection sheet 63 will be described. As can be seen from FIGS. 5A and 5B, the deflection sheet 63 has a sheet shaped body 63a and a unit prism portion 63b provided on the surface of the body 63a, which faces the light guiding plate 61, that is, the light incident side.

As described below, the deflection sheet 63 intensively increases brightness of the light being incident in parallel with the normal direction of the panel surface of the liquid crystal panel 6 (that is, the deflection sheet 63 has light condensing function), by changing (deflecting) the transmission direction of the light being incident from the light incident side and emitting the light from the light emission side. The light condensing function is mainly attributed to the unit prism portion 63b of the deflection sheet 63.

As shown in FIGS. 5A and 5B, the body 63a functions as a flat sheet-like member that supports the unit prism portion 63b. A surface of the body 63a that is opposite to the side facing the light guiding plate 61 is the light emission side. In this embodiment, the surface of the light emission side of the body 63a is flat and smooth. However, the surface of the light emission side is not limited to the smooth; the light emission side may have a surface with microasperity (so-called mat surface). Also, various surface aspects can be applied as necessary.

As shown in FIGS. 5A and 5B, the unit prism portion 63b is disposed such that the plural unit prisms 63c are arranged along the light incident side of the body 63a. More specifically, the plural unit prisms 63c are pillared members and are arranged in a direction orthogonal to the alignment direction of the light sources 62 (extension direction of the light source, when the light source is a linear fluorescent lamp). Meanwhile, the unit prisms 63c extend in a direction orthogonal to their arrangement direction with maintaining cross-sectional shapes shown in FIG. 5B.

A longitudinal direction of the unit prism 63c crosses the transmission axis of the polarizing plate 5, when the unit prism 63c is observed from the front side. Preferably, the longitudinal direction of the unit prism 63c of the deflection sheet 63 crosses the transmission axis of the polarizing plate 5 of the liquid crystal panel 6 at an angle larger than 45° and smaller than 135°, when the unit prism 63c is observed from the front side. In this case, the angle means a smaller angle of the angles formed by the longitudinal direction of the unit prism 63c and the transmission axis of the polarizing plate 5, that is, an angle equal to or smaller than 180°. In particular, the angle is preferably 90° and the direction where the unit prisms 63c are arranged is preferably parallel to the transmission axis of the polarizing plate 5.

Next, a cross-sectional shape of the arrangement direction of the unit prisms 63c will be described. As can be seen from FIG. 5B, the unit prism 63c has an isosceles triangular cross-sectional shape that protrudes from the light guiding plate 61 side surface of the body 63a.

The deflection sheet 63 having the above-described configuration can be manufactured by molding or forming the unit prism 63c shape on the body 63a. The material of the deflection sheet 63 is not limited in particular. However, as the material of the deflection sheet 63, a widely used material for the optical sheet embedded in the display device, which is excellent in the mechanical characteristic, the optical characteristic, the stability, the workability and the economic efficiency, is preferably used. Examples of the material include: transparent resins comprising one or more kinds of acryl, styrene, polycarbonate, polyethylene terephthalate, acrylonitrile and the like as a main component; and epoxy acrylate-based or urethane acrylate-based reactive resins (ionizing radiation-curable resin and the like).

In this embodiment, the unit prism which cross-sectional shape is the triangular shape is described. However, the cross-sectional shape of the unit prism is not limited thereto. The cross-sectional shape of the unit prism may be a trapezoidal shape where the apex of the triangle is a shorter upper base. Alternatively, the oblique lines of the triangle may be polygonal lines or curved lines.

The reflection sheet 64 is a member for reflecting the light emitted from the back surface of the light guiding plate 61 and then entering the light into the guiding plate 61 again. As the reflection sheet 64, a sheet that enables specular reflection, for example, a sheet that is formed of a high reflectance material such as metal and a sheet that includes a thin film (for example, thin metal film) formed of a material having high reflectance as the surface layer, is preferably applied. Thereby, light-use efficiency can be improved and energy use efficiency can be improved.

In the image source 60 that has the above-described configuration, the light can be controlled as follows. That is, the light emitted from the light source 62 enters into the light guiding plate 61 through the light incident surface, which is the side surface of the light guiding plate 61. The light entered into the light guiding plate 61 transmit to the opposite direction of the light source 62 in the light guiding portion 61a with repeating reflection, which is caused by the refractive index difference between air and the light guiding portion 61a and by the effect of the reflection sheet 64 and occurred at the light guiding plate 61 side surface of the deflection sheet 63 and the light guiding plate 61 side surface of the reflection sheet 64.

However, among the light entering into the light guiding portion 61a, the light which reaches the reflection dots 61b is diffused and reflected at the reflection dots 61b and thereby the light is deflected. As the result, the light may be incident on the deflection sheet 63 side surface of the light guiding plate 61 at an incident angle of less than the total reflection critical angle. In this case, the light can be emitted from the deflection sheet 63 side surface.

The light emitted from the deflection sheet 63 side surface of the light guiding plate 61 is outputted to the deflection sheet 63.

The reflection dots 61b are disposed in a certain pattern so as to equalize the light intensity distribution along the light guiding direction of the light emitted from the deflection sheet 63 side surface of the light guiding plate 61.

The light emitted from the light guiding plate 61 is then incident on the deflection sheet 63. The unit prism 63c of the deflection sheet 63 deflects the light by refracting on the incident surface of the unit prism 63c and thereby the light is condensed. By the optical function of the deflection sheet 63, the front brightness of the light, which is equalized by the light guiding plate 21, can be increased.

The light emitted from the deflection sheet 63 is incident on the polarizing plate 5. The polarizing plate 5 transmits one polarization component of the incident light and absorbs the other polarization component. The light transmitted through the polarizing plate 5 selectively transmits the polarizing plate 7 in response to the electric field application for each pixel. In this way, by transmitting the light selectively on a pixel to pixel basis by the liquid crystal panel 6, the observer can observe the image.

As described above, the front brightness of the light can be increased by equalizing the light by the light guiding plate 61 and condensing the light by the deflection sheet 63. That is, by the unit prism 63c of the deflection sheet 63, the light is condensed in the direction that is parallel to the normal direction of the panel surface of the liquid crystal panel 6 (front direction). As a result, the front brightness can be effectively increased.

Figure 6A:
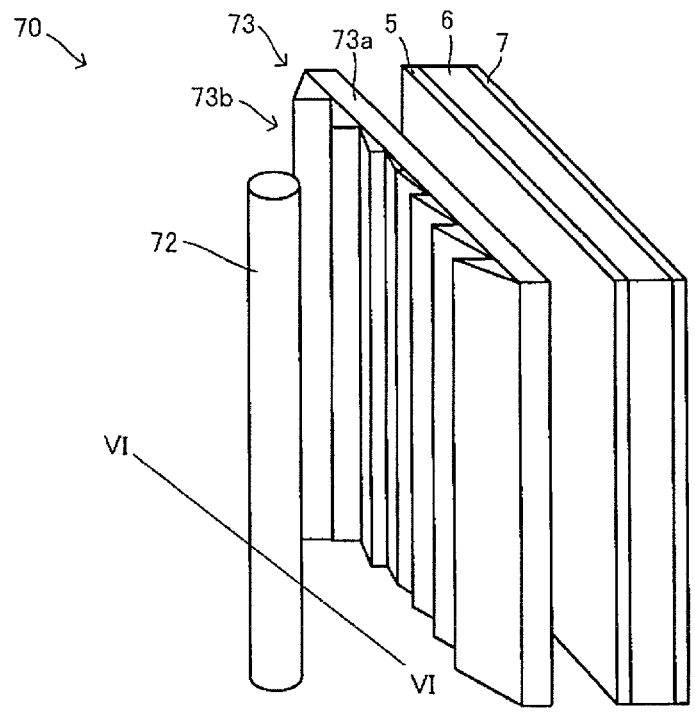
FIG. 6A is an exploded perspective view of an image source according to a second modification.
Figure 6B:
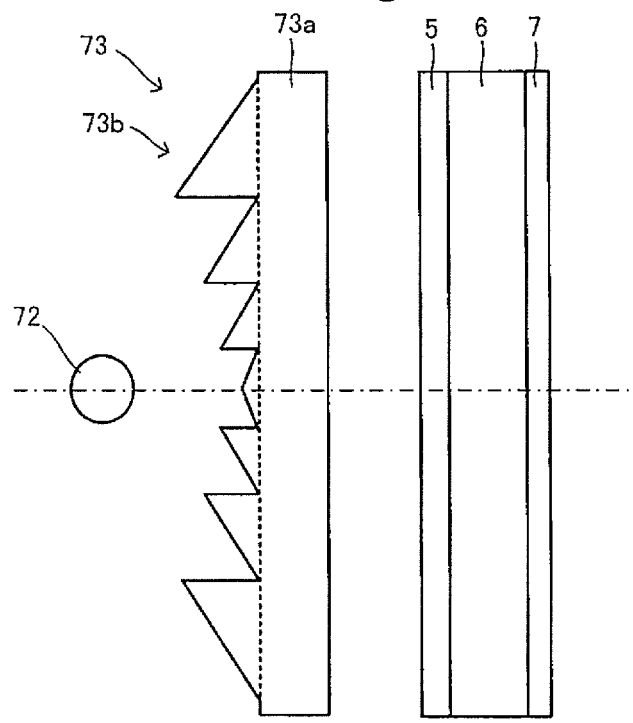
FIG. 6B is a cross-sectional view of the image source according to the second modification.

FIGS. 6A and 6B show an image source 70 according to a second modification. FIG. 6A is an exploded perspective view of the image source 70 and FIG. 6B is a cross-sectional view taken along the line VI-VI of FIG. 6A.

The image source 70 comprises a light source 72, a deflection sheet 73, polarizing plates 5 and 7, and a liquid crystal panel 6. Among them, since the polarizing plates 5 and 7 and the liquid crystal panel 6 are the same as those of the image source 8 described above, the same reference numerals are denoted and the description thereof is not repeated here.

The light source 72 is a light source which extends in one direction. In this embodiment, the light source 72 is configured as a long light source. For example, a fluorescent lamp such as a linear cold cathode tube may be used. Alternatively, plural point-like light sources may be arranged in one direction. In this case, point-like LEDs may be used.

As can be seen from FIGS. 6A and 6B, the deflection sheet 73 has a body 73a that is formed in a sheet shape and a Fresnel lens portion 73b that is provided on the light source 72 side (the light incident side) surface of the body 73a.

As described below, the deflection sheet 73 has a function (condensing function) to change (deflect) the transmission direction of the light incident from the light incident side and to emit the light from the light emission side, and thereby increasing the brightness of the front direction (normal direction) intensively. The condensing function is mainly due to the Fresnel lens portion 73b of the deflection sheet 73.

As shown in FIGS. 6A and 6B, the body 73a functions as a flat sheet-like member that supports the Fresnel lens portion 73b. A surface of the body 73a, which is opposite to the surface facing the light source 72 of the body 73a, is the light emission side. In this embodiment, the light emission side of the body 73a is formed as a flat and smooth surface. However, the light emission side is not limited to the smooth; the light emission side may have a surface with microasperity (so-called mat surface). Also, various surface aspects can be applied as necessary.

The Fresnel lens portion 73b is composed of a Fresnel lens group; each lens has a Fresnel lens shape in a cross section orthogonal to an extension direction of the light source 72, as shown in FIGS. 6A and 6B. In the extension direction of the light source 72, the Fresnel lens portion 73b extends while maintaining the cross-sectional shape. Since a known shape lens can be used as the Fresnel lens, the description thereof is not repeated here.

The above-described deflection sheet 73 can be manufactured by molding the Fresnel lens group on the body 73a. The material of the deflection sheet 73 is not limited in particular. However, as the material of the deflection sheet 73c, a widely used material for the optical sheet embedded in the display device, which is excellent in the mechanical characteristic, the optical characteristic, the stability, the workability and the economic efficiency, is preferably used. Examples of the material include: transparent resins comprising one or more kinds of acryl, styrene, polycarbonate, polyethylene terephthalate, acrylonitrile and the like as a main component; and epoxy acrylate-based or urethane acrylate-based reactive resins (ionizing radiation-curable resin and the like).

In the above-described image source 70, the light can be controlled as follows. That is, the light that is emitted from the light source 72 illuminates the entire surface of the Fresnel lens portion 73b of the deflection sheet 73 while diffusing in the direction orthogonal to the longitudinal direction of the light source 72, and then is incident on the Fresnel lens portion 73b. The transmission direction of the light that is incident on the Fresnel lens portion 73b is deflected by the effect of the Fresnel lens and the light is condensed in the front direction of the sheet (normal direction of the panel surface of the liquid crystal panel 6). In this way, by an optical function of the deflection sheet 73, the light emitted from the light source 72 is deflected and the front brightness of the light can be increased.

The light emitted from the deflection sheet 73 is incident on the polarizing plate 5. The polarizing plate 5 transmits one polarization component of the incident light and absorbs the other polarization component. The light transmitted through the polarizing plate 5 selectively transmits the polarizing plate 7 in response to the electric field application for each pixel. In this way, by transmitting the light selectively by the liquid crystal panel 6 on a pixel to pixel basis, the observer can observe the image.

As described above, the front brightness of the light can be increased by the condensing function of the deflection sheet 73. That is, the light is deflected and condensed in the front direction (transmission direction of the light) by the Fresnel lens portion 73b of the deflection sheet 73, and thereby the front brightness of the light can be effectively increased.

In this case, the surface of the deflection sheet 73, which is opposite to the side where the Fresnel lens portion 73b is provided, may be adhered directly or with a certain gap to the polarizing plate 5 by the adhesive.

Figure 7A:
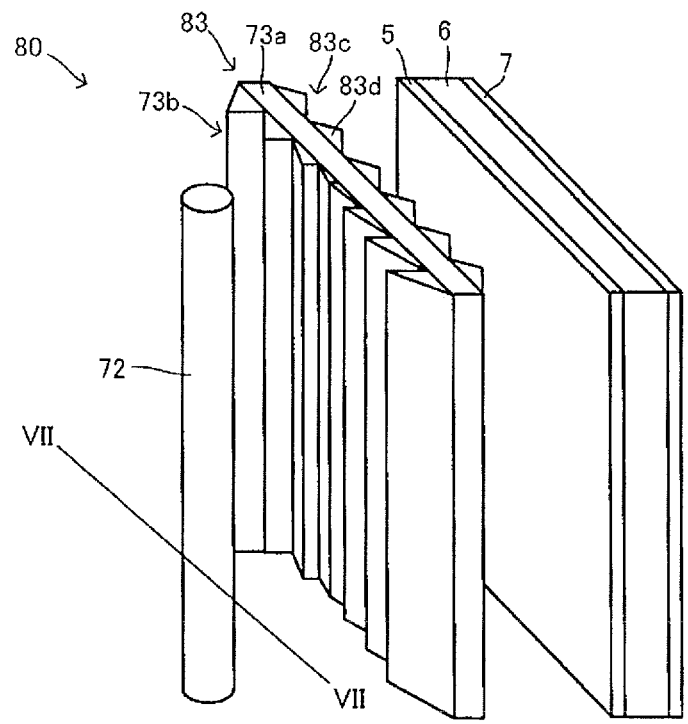
FIG. 7A is an exploded perspective view of an image source according to a third modification.
Figure 7B:
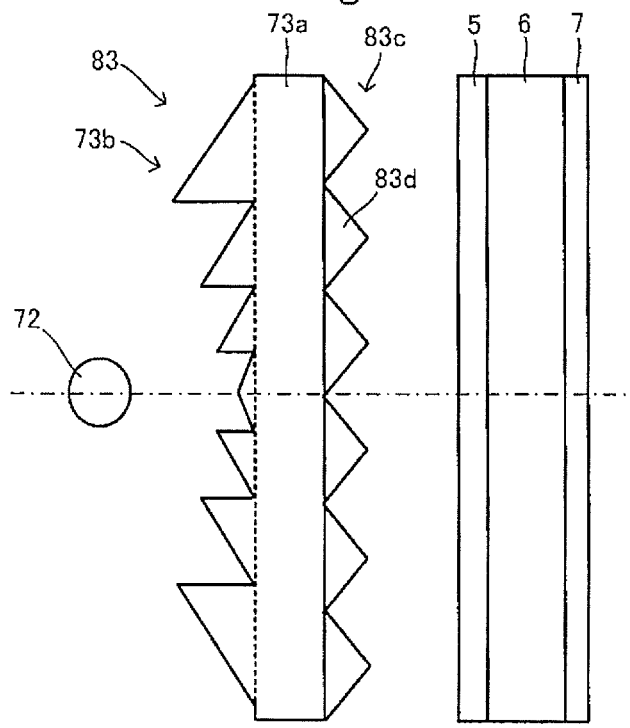
FIG. 7B is a cross-sectional view of the image source according to the third modification.

FIGS. 7A and 7B show an image source 80 according to a third modification. FIG. 7A is an exploded perspective view of the image source 80 and FIG. 7B is a cross-sectional view taken along the line of FIG. 7A.

The image source 80 includes a light source 72, a deflection sheet 83, polarizing plates 5 and 7, and a liquid crystal panel 6. Among them, since the light source 72, the polarizing plates 5 and 7, and the liquid crystal panel 6 are the same as those of the image source 70 described above, the same reference numerals are denoted and the description thereof is not repeated here.

As can be seen from FIGS. 7A and 7B, the deflection sheet 83 has a body 73a that is formed in a sheet shape, a Fresnel lens portion 73b that is provided on the light source 72 side (the light incident side) surface of the body 73a, and a unit prism portion 83c that is disposed on a surface of the body 73a opposite to the side of the Fresnel lens portion 73b. Among them, since the body 73a and the Fresnel lens portion 73b are the same as those of the deflection sheet 73 described above, the same reference numerals are denoted and the description thereof is not repeated here.

The deflection sheet 83 is different from the deflection sheet 73 in that the unit prism portion 83c is provided. As shown in FIGS. 7A and 7B, the unit prism portion 83c is disposed such that the plural unit prisms 83d are arranged along the light emission side of the body 73a. More specifically, the plural unit prisms 83d are pillared members and are arranged in a direction orthogonal to a direction to which the light source 72 is extended. Meanwhile, the unit prism 83d has a cross-sectional shape shown in FIG. 7B and extends in a direction orthogonal to the arrangement direction.

As shown in FIG. 7B, the unit prism 83d has a cross section of an isosceles triangle that protrudes out of the surface opposite to the polarizing plate 5 side surface of the body 73a. Thereby, the light, which is emitted from the light emission surface of the deflection sheet 83, is deflected in the front direction and is condensed.

In the above-described image source 80 that has the above-described configuration, the light can be controlled as follows. That is, the light emitted from the light source 72 illuminates the entire surface of the Fresnel lens portion 73b of the deflection sheet 83 while diffusing in the direction orthogonal to the longitudinal direction of the light source 72, and then is incident on the Fresnel lens portion 73b. The transmission direction of the light incident on the Fresnel lens portion 73b is deflected by the effect of the Fresnel lens and the light is condensed in the front direction (normal direction of the panel surface of the liquid crystal panel 6) of the sheet.

Then, when the light is emitted from the deflection sheet 83, by the unit lens 83d, the light is deflected to the front direction of the sheet and is condensed. In this way, by an optical function in the deflection sheet 83, the light emitted from the light source 72 is deflected and the front brightness of the light can be increased.

The light emitted from the deflection sheet 83 is incident on the polarizing plate 5. The polarizing plate 5 transmits one polarization component of the incident light and absorbs the other polarization component. The light transmitted through the polarizing plate 5 selectively transmits the polarizing plate 7 in response to the electric field application for each pixel. In this way, by transmitting the light selectively by the liquid crystal panel 6 on a pixel to pixel basis, the observer can observe the image.

As described above, the front brightness of the light can be increased by the condensing function of the deflection sheet 83. That is, by the Fresnel lens portion 73b and the unit lens portion 83c of the deflection sheet 83, the light is condensed in the front direction (transmission direction of the light), and thereby the front brightness of the light can be very effectively increased.

Returning to FIG. 2, the image source unit 1 will be described. The case in which the image source 8 is applied will be described below. However, instead of the image source 8, the image sources 60, 70, and 80 according to the first to third modifications may be applied.

The adhesive layer 9 is a layer where the adhesive is disposed to adhere the optical sheet 10 to the image source 8. The adhesive used as the adhesive layer 9 is not limited in particular, as long as the adhesive transmits the light and has appropriate adhesivity. The term "adhesive" used herein means a kind of bond, which can adhere the optical sheet to the image source 8 only by pressing properly (such as gently pressing by a hand, in general) due to the adhesive force of its surface. For exhibiting adhesive force of the adhesive, physical energy or action such as heating, humidification, and irradiation of radiation (such as ultraviolet rays or electronic rays) are not needed and a chemical reaction such as a polymerization reaction is also not needed. The adhesive force, which is relatively low so that the adhesive can be separated after the adhesion, can be maintained for a relatively long time. The adhesive force is about several N/25 mm to 20N/25 mm.

The optical sheet 10 comprise a base material layer 11, an optical functional layer 12, an adhesive layer 17, a TAC film layer 18, and an anti-glare layer (AG layer) 19.

The base material layer 11 is the base layer for forming the optical functional layer 12; the optical functional layer 12 is formed on one surface of the base material layer 11. The base material layer 11 is formed by, for example, polyethylene terephthalate (PET) as a main component. In the case when PET is used for forming the base material layer 11, the base material layer 11 may contain at least PET as a main component, and also may contain other resins. Herein, "the main component" refers to the component which content rate is 50 mass % or more of the whole base material layer. In addition, various additives may be added to the base material layer 11. Examples of general additives include antioxidants such as phenols, stabilizers such as lactones and the like.

The case in which a PET film is used as the base material layer 11 has been explained above, however, the material for the base material layer 11 is not limited to PET; for example, "polyester resin" such as polybutylene terephthalate resin (PET) and polytrimethylene terephthalate (PTT) resin can be used. In this embodiment, a resin comprising polyethylene terephthalate (PET) as a main component has been explained as a preferable material from a viewpoint of not only performance, but also mass productivity, cost, availability and the like.

Figure 8:
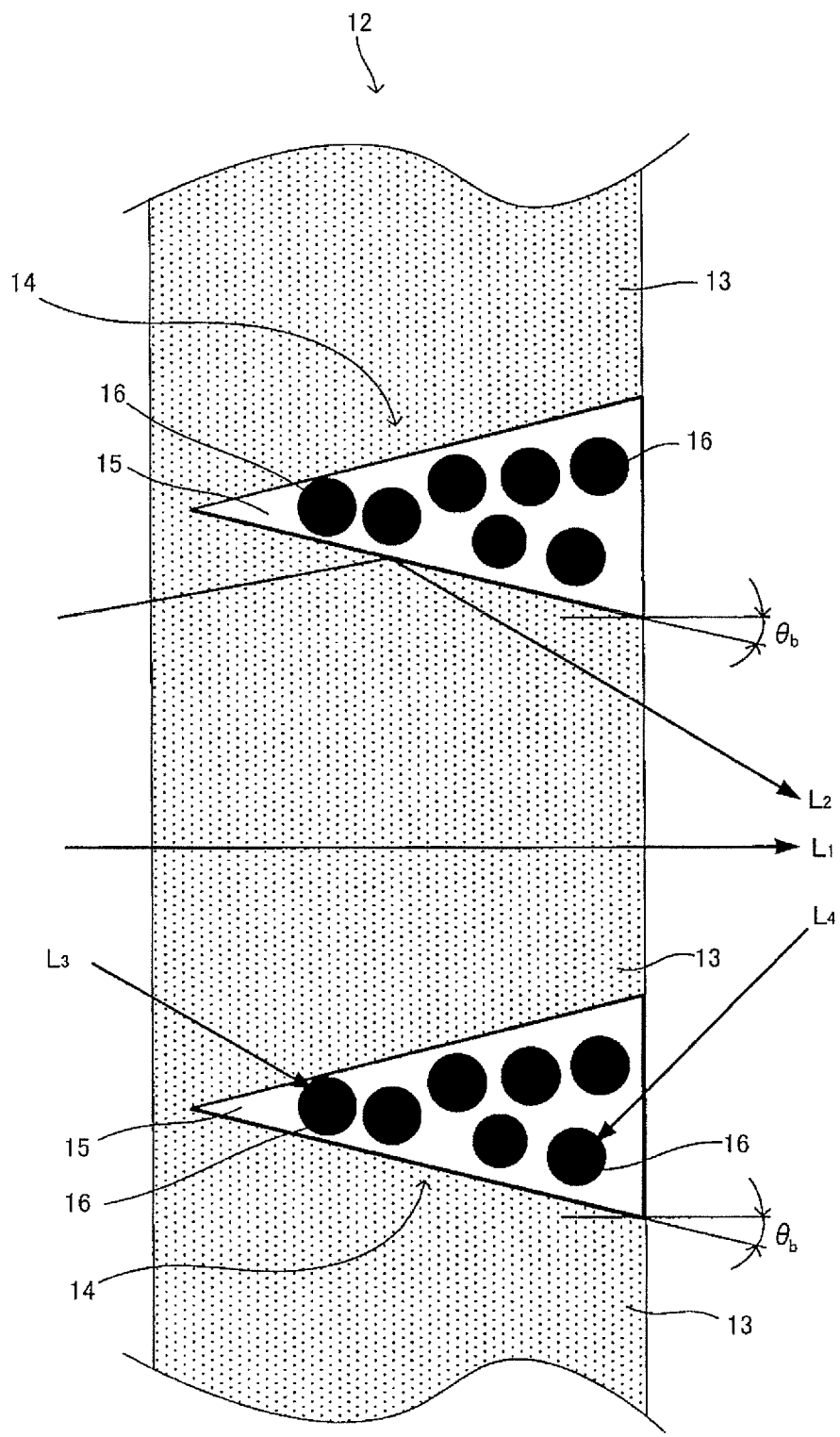
FIG. 8 is a partially enlarged view of an optical functional layer of the optical sheet that is included in the image source unit shown in FIG. 2.

The optical functional layer 12 comprises light-transmitting portions 13,13,... that have an approximately trapezoidal shape in a cross section of a sheet thickness direction and low refractive-index portions 14, 14,... disposed between the light-transmitting portions 13,13, . . . . FIG. 8 is an enlarged view of the two low refractive-index portions 14, 14 and the light-transmitting portions 13, 13, 13 that are adjacent to the low refractive-index portions 14, 14. Referring to FIGS. 2 and 8, the optical functional layer 12 will be described.

Each of the light-transmitting portions 13, 13, . . . is an element that is disposed such that the base material layer 11 side (side of the image source 8) is a lower base and the other side (observer side) is an upper base, and has a cross section of an approximately trapezoidal shape. The light-transmitting portions 13 are formed of a light-transmitting resin that has a refractive index of $N_p$.

As a constituent of the light-transmitting portions 13, for example, a photocurable resin composition that is obtained by a photocurable prepolymer (P1), which is combined with a reactive dilution monomer (M1) and a photopolymerization Initiator (S1), is preferably used.

Examples of the aforementioned photocurable prepolymer (P1) include, for example, prepolymers of epoxy acrylates, urethane acrylates, polyether acrylates, polyester acrylates, polythiols and the like.

Examples of the aforementioned reactive dilution monomer (M1) include, for example, vinyl pyrrolidone, 2-ethylhexyl acrylate, (β-hydroxy acrylate, tetrahydrofurfuryl acrylate and the like. In addition to them, at least one of vinyl compounds having a fluorene backbone, acrylic acid ester compounds having a fluorene backbone, and methacrylic acid ester compounds having a fluorene backbone may be also used for enhancing the refractive index.

Examples of the aforementioned photo-polymerization initiator (S1) include, for example, hydroxybenzoyl compounds (2-hydroxy-2-methyl-1-phenylpropan-1-one, 1-hydroxycyclohexylphenyl ketone, benzoin alkyl ether and the like), benzoyl formate compounds (methylbenzoyl formate and the like), thioxanthone compounds (isopropyl thioxanthone and the like), benzophenones (benzophenone and the like), phosphoric acid ester compounds (1,3,5-trimethylbenzoyldiphenyl phosphine oxide, bis(2,4,6-trimethylbenzoyl) phenyl phosphine oxide and the like), benzyldimethyl ketals and the like. The photo-polymerization initiator (S1) may be arbitrarily selected from compounds exemplified above depending on the type of an irradiation apparatus for curing the photo-curable resin composition and curability of the photo-curable resin composition.

The value of $N_p$ is not limited in particular. However, $N_p$ is preferably 1.45 to 1.60, from a viewpoint of availability of the exemplified application material. The image light transmits in the light-transmitting portions 13, 13, . . . and then is provided to the observer side.

The low refractive-index portions 14, 14, . . . are portions that are disposed between the light-transmitting portions 13, 13, . . . . The cross-sectional shape of each of the low refractive-index portions 14 is an approximately triangular shape (wedge shape); the upper base of the light-transmitting portion 13 is the base and a lower base of each of the light-transmitting portion 13 is the apex facing its base. The low refractive-index portions 14, 14, . . . have binder portions 15, 15, . . . where a material having a refractive index of $N_b$ is filled and light absorbing particles 16, 16, . . . that are added to the binder portions 15, 15, . . . . When the external light is incident on the low refractive-index portions 14, 14, . . . , the external light is absorbed and the influence on the image light by the external light can be decreased; thereby contrast can be improved.

The binder material filled into the binder portions 15, 15, . . . is composed of a material that has a refractive index $N_b$ which is smaller than the refractive index $N_p$ of the light-transmitting portions 13, 13, . . . . The value of the $N_b$ is not limited in particular. However, $N_b$ is preferably 1.45 to 1.60 from a viewpoint of availability of the material.

The binder to be used is not particularly limited, but, for example, a photo-curable resin composition, in which a reactive dilution monomer (M2) and a photo-polymerization initiator (S2) are blended with a photo-curable prepolymer (P2), is preferably used as the binder.

Examples of the aforementioned photo-curable prepolymer (P2) include, for example, urethane (meth)acrylate, polyester (meth)acrylate, epoxy (meth)acrylate, and butadiene (meth)acrylate and the like.

Examples of the aforementioned reactive dilution monomer (M2) include a monofunctional monomer such as: vinyl monomers such as N-vinyl pyrrolidone, N-vinyl caprolactone, vinyl imidazole, vinyl pyridine and styrene; and (meth) acrylic acid ester monomers and (meth)acryl amide derivatives such as lauryl (meth)acrylate, stearyl (meth)acrylate, butoxy ethyl (meth)acrylate, ethoxy diethylene glycol (meth) acrylate, methoxy triethylene glycol (meth)acrylate, methoxy polyethylene glycol (meth)acrylate, methoxy dipropylene glycol (meth)acrylate, paracumyl phenoxy ethyl (meth) acrylate, nonyl phenoxy polyethylene glycol (meth)acrylate, tetrahydrofurfuryl (meth)acrylate, isobornyl (meth)acrylate, cyclohexyl (meth)acrylate, benzyl methacrylate, N,N-dimethyl (meth)acryl amide, N,N-dimethyl aminopropyl (meth) acrylate and acryloyl morpholine. In addition, examples of the aforementioned reactive dilution monomer (M2) also include a multi-functional monomer such as: ethylene glycol di(meth)acrylate, diethylene glycol di(meth)acrylate, triethylene glycol di(meth)acrylate, polyethylene glycol di(meth) acrylate, tripropylene glycol di(meth)acrylate, polytetramethylene glycol di(meth)acrylate, 1,4-butanediol di(meth) acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethylol-tricyciodecane di(meth)acrylate, hydroxypivalic acid neopentyl glycol di(meth)acrylate, bisphenol A polypropoxydiol di(meth) acrylate, trimethylol propane tri(meth)acrylate, ethoxylated trimethylol propane tri(meth)acrylate, propoxylated trimethylol propane tri(meth)acrylate, pentaerythritol tri(meth) acrylate, glyceryl tri(meth)acrylate, propoxylated glyceryl tri(meth)acrylate, tris(2-hydroxyethyl)isocyanurate triacrylate, pentaerythritol tetra(meth)acrylate, ditrimethylol propane tetra(meth)acrylate, dipentaerythritol penta(meth)acrylate, dipentaerythritol hexa(meth)acrylate.

Examples of the photo-polymerization initiator (S2) include: 1-hydroxycyclohexylphenyl ketone, 2-hydroxy-2-methyl-1-phenylpropan-1-one, 2,2-dimethoxy-1,2-diphenylethan-1-one, 2,4,6-trimethylbenzoyldiphenyl phosphine oxide, bis(2,4,6-trimethylbenzoyl)phenyl phosphine oxide. The photo-polymerization initiator (S2) may be arbitrarily selected from these depending on the irradiation apparatus for curing the photo-curable resin composition and curability of the photo-curable resin composition.

The difference between the refractive index $N_p$ of the light-transmitting portions 13, 13, . . . and the refractive index $N_b$ of the binder portions 15, 15, . . . is not limited in particular. However, the difference $N_p-N_b$ is preferably 0.09 or more. In this way, by setting the refractive index of the low refractive-index portions 14, 14, . . . to be lower than the refractive index of the light-transmitting portions 13, 13, . . . the light that satisfies a certain conditions can be reflected at the interface between the low refractive-index portions and the light-transmitting portions. However, the relationship among $N_p$, $N_b$, the half-value angle of the divergence angle of the image light emitted from the image source 8, and the angle formed by the oblique sides of the low refractive-index portions need to satisfy a relationship to be described later.

The light absorbing particles 16, 16, . . . preferably have an average particle size of 1 μm or more from a viewpoint of availability and productivity. The light absorbing particles 16 are colored with particles such as carbon or colorants such as red dye, blue dye, yellow dye, black dye, and the like with a certain concentration. As the light absorbing particles 16, 16, . . . commercially available colored resin particles may be used. The refractive index of the light absorbing particles 16, 16, . . . is not limited in particular.

If the average particle size is smaller than 1 μm, the large amount of the light absorbing particles may be densely aggregated on the interface between the light-transmitting portions and the low refractive-index portions, and thereby a part of the image light to be totally reflected may be easily absorbed. By setting the average particle size to 1 μm or more, the amount of light absorbing particles disposed on the interface can be decreased and the amount of totally reflected light can be secured appropriately.

The light absorbing performance of the low refractive-index portions 14, 14, . . . can be appropriately adjusted depending on the intended purpose. However, the low refractive-index portions 14, 14, . . . are preferably configured to have light absorbing performance such that the transmittance is 40 to 70% when measuring the transmittance of the sheet 6 μm thick formed of only the material constituting the low refractive-index portions. The means for adjusting the transmittance to 40 to 70% is not limited in particular. However, adjusting the content of the light absorbing particles may be exemplified.

The oblique sides (two sides that extend in a sheet thickness direction) of the low refractive-index portions 14, 14, . . . have an angle of $\theta_b$ with respect to the normal line of the sheet surface. A range of the angle $\theta_b$ is described in detail below.

In this embodiment, the low refractive-index portions 14 are configured to have a function of absorbing light, in addition to the function of reflecting the light incident with a certain conditions. However, the low refractive-index portions 14 may not have the function of absorbing the light. That is, at least the low refractive-index portions may reflect a specific light at the interface between the light-transmitting portions and the low refractive-index portions and emit the light in a direction resulting in widening the viewing angle, as described below.

The adhesive layer 17 is a layer where the adhesive is disposed to adhere the optical functional layer 12 to the TAC film layer 18. The adhesive used in the adhesive layer 17 is not limited in particular, as long as the adhesive transmits the light and can adhere the optical functional sheet layer 12 to the other layer. The term "adhesive" used herein means a kind of bond, which can bond the optical functional layer to the TAC film layer only by pressing properly (such as gently by a hand, in general), due to the adhesive force of its surface. For exhibiting adhesive force of the adhesive, physical energy and action such as heating, humidification, and irradiation of radiation (such as ultraviolet rays or electronic rays) are not needed and a chemical reaction such as a polymerization reaction is also not needed. The adhesive force, which is relatively low so that the adhesive can be separated after the adhesion, can be maintained for a relatively long time. The adhesive force is about several N/25 mm to 20N/25 mm.

The TAC film layer 18 is a film that is formed of triacetyl-cellulose and is used as a protective film. As the TAC film used in the TAC film layer 18, a TAC film used in a general liquid crystal display panel unit may be applied.

The AG layer 19 is a film (anti-glare film) that may prevent glaring when the observer views a screen. As the anti-glare film, a commercially available AG film can be applied. In this embodiment, the AG layer is used. However, instead of the AG layer, an AR layer may be disposed. The AR layer means an "anti-reflection layer" and can prevent reflection.

In the optical sheet 10, in addition to the above layers, a film that has a certain function may be laminated depending on the intended purpose. For example, a film that has light diffusion particles may be laminated. By this film, the image light can be further diffused.

By the display device that has the above mentioned image source unit 1, the image light is transmitted along the following optical path. FIG. 8 shows an example of an optical path. If the display device is operated, as shown in FIG. 8, image light $L_1$ transmits the light-transmitting portion 13 and is emitted to the observer side.

Image light $L_2$ incident with a certain conditions is totally reflected at the interface between the light-transmitting portions 13 and the low refractive-index portions 14 and is emitted to the observer side. At this time, since the oblique sides of the low refractive-index portions 14 are inclined as described above, the angle of the light is changed before and after the reflection by the oblique sides, and the image light can be emitted in a direction resulting in widening the viewing angles. Thereby, a wide viewing angle can be obtained.

Image light $L_3$ is transmitted into the low refractive-index portions 14 without being reflected on the interface between the light-transmitting portions 13 and the low refractive-index portions 14, and is absorbed by the light absorbing particles 16. Meanwhile, external light $L_4$ is transmitted into the low refractive-index portions 14 and is absorbed by the light absorbing particles 16. In this way, since a part of the external light incident with the predetermined conditions or stray light is absorbed by the light absorbing particles, contrast can be improved.

Figure 9:
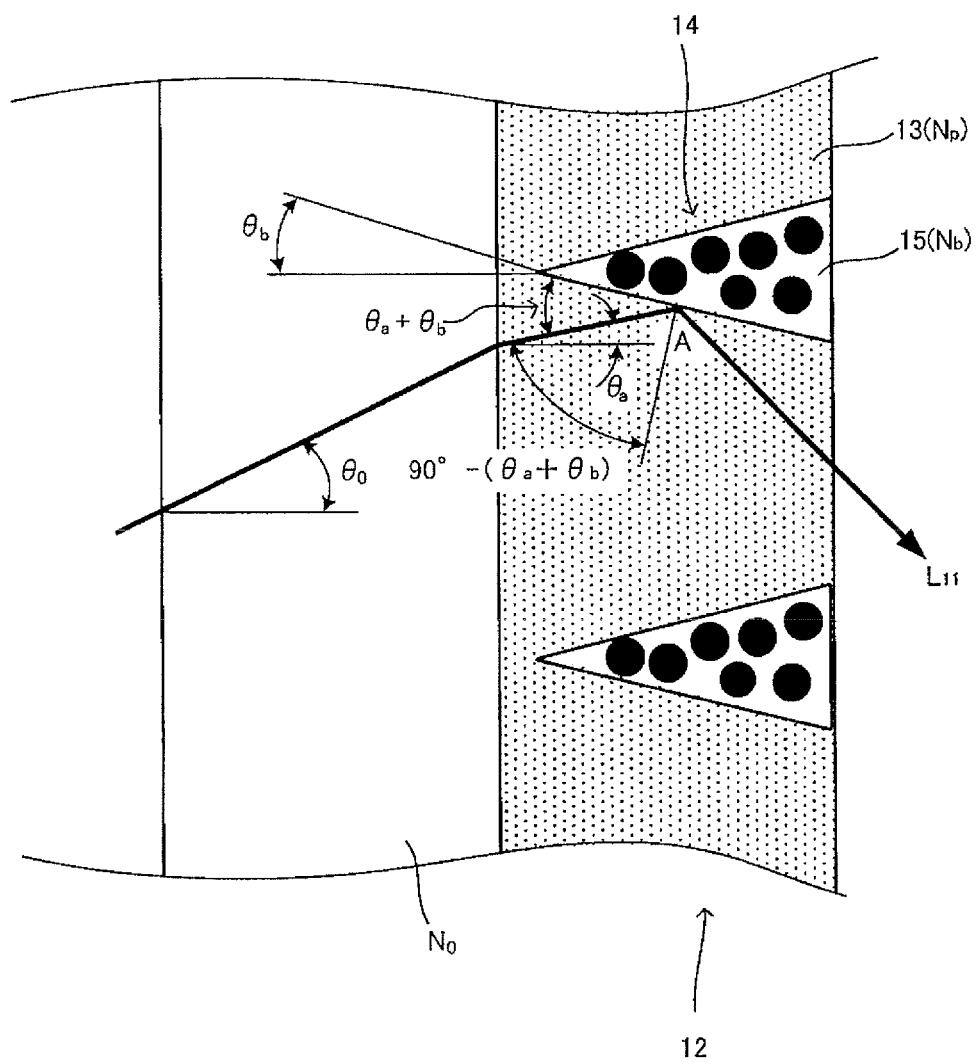
FIG. 9 is a diagram showing a condition for total reflection.

Hereinafter, the display device will be described in detail with reference to FIG. 9. FIG. 9 shows a condition for the total reflection of the image light $L_{11}$ at the interface between the light-transmitting portions 13 and the low refractive-index portions 14 when a half-value angle of a divergence angle of the image light $L_{11}$ emitted from the image source 8 is set to $\theta_0$.

From FIG. 9, an angle $\theta_a$ of the light $L_{11}$ incident on the light-transmitting portions 13 is represented by the following equation 1 based on the Snell's law, when $N_0$ is set as a refractive index of air in consideration of an air layer.

(Equation 1)

$$\theta_a = \sin^{-1}\left(\frac{N_0}{N_p} \cdot \sin\theta_0\right) \quad (1)$$

Meanwhile, an incident angle of the light incident on the interface between the light-transmitting portions 13 and the low refractive-index portions 14 can be represented by the following equation 2.

(Equation 2)

$$90° - (\theta_a + \theta_b) \quad (2)$$

In this case, in order to reflect the light totally at the interface between the light-transmitting portions 13 and the low refractive-index portions 14, the corresponding incident angle needs to be equal to or more than an incident angle represented by the following equation 3.

[Equation 3]

$$\sin^{-1}\frac{N_b}{N_p} \quad (3)$$

Therefore, the following equation 4 is established.

(Equation 4)

$$\sin^{-1}\frac{N_b}{N_p} \leqq 90° - (\theta_a + \theta_b) \quad (4)$$

From the above equations, the equation 5 may be established by substituting the equation 1 for the equation 4.

[Equation 5]

$$\sin^{-1}\frac{N_b}{N_p} \leqq 90° - \left\{\sin^{-1}\left(\frac{N_0}{N_p}\cdot\sin\theta_0\right) + \theta_b\right\} \quad (5)$$

According to the image source unit 1 satisfying the above conditions and the display device including the image source unit, the amount of the image light, which is totally reflected at the interface between the light-transmitting portions 13, 13, . . . and the low refractive-index portions 14, 14, . . . and is then emitted to the observer side, can be increased, and thereby use efficiency of the image light can be improved. That is, by adjusting the half-value angle $\theta_0$ of the divergence angle, the large part of the image light can be efficiently reflected on the interface between the light-transmitting portions 13, 13, . . . and the low refractive-index portions 14, 14, . . . .

The half-value angle $\theta_0$ of the divergence angle is controlled by the image source. According to the image source described above, $\theta_0$ can be appropriately controlled and thereby the equation 5 can be easily satisfied. As a result, the image light can be efficiently reflected at the interface between the light-transmitting portions 13 and the low refractive-index portions 14.

Figure 10:
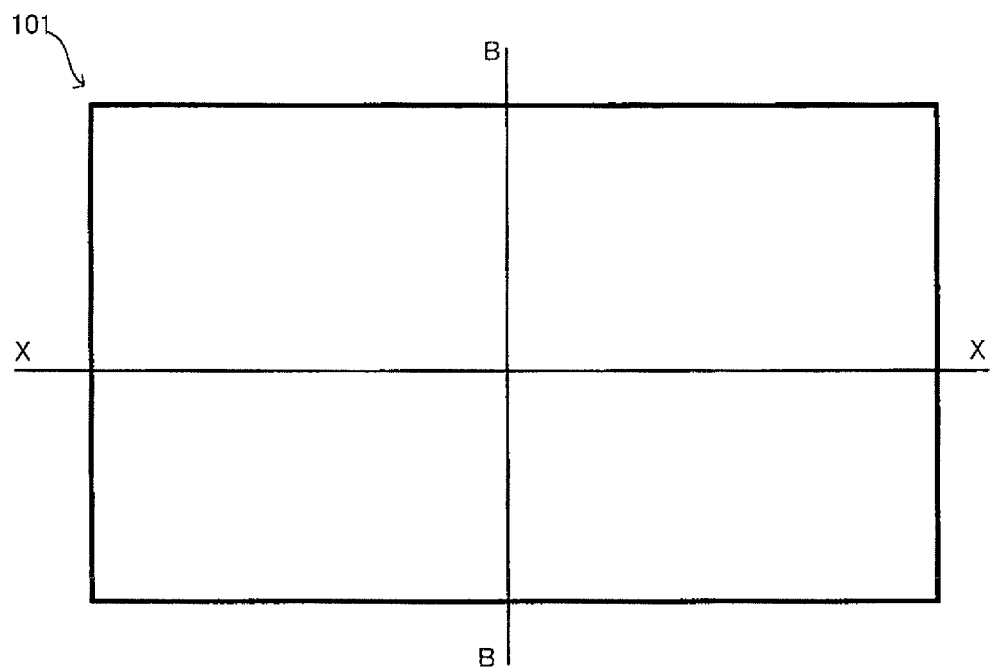
FIG. 10 is a front view of a display device according to a second embodiment.
Figure 11:
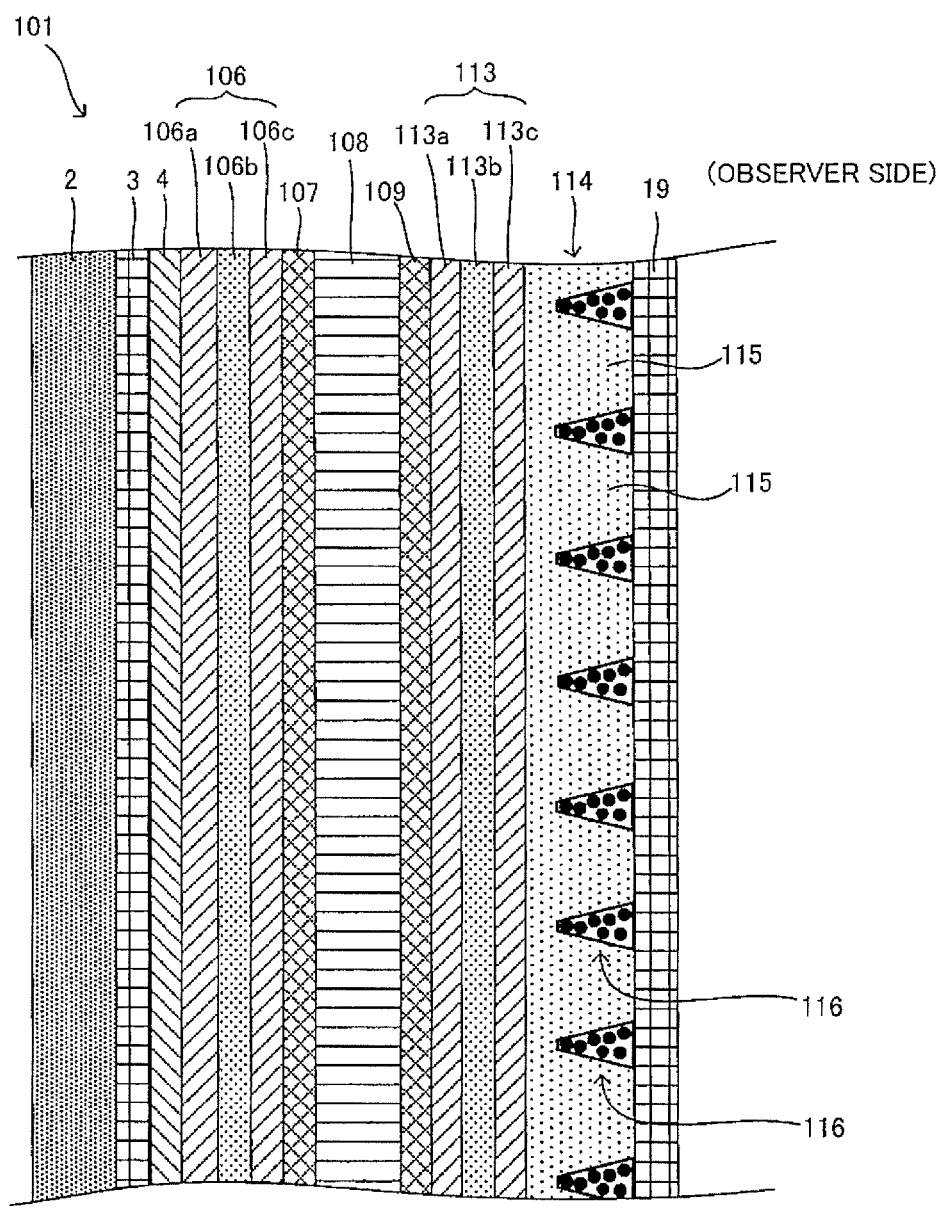
FIG. 11 is a cross-sectional view of an image source unit provided in the display device shown in FIG. 10 and shows a schematic layer structure thereof.

FIG. 10 is a front view of an image source unit 101 provided in a display device according to a second embodiment. FIG. 11 shows a schematic layer structure in a cross section taken along the line X-X of FIG. 10, that is, a cross section orthogonal to a direction to which the low refractive-index portions 115, 115, . . . of the optical functional layer 114 extend. The direction along the line X-X is a polarization direction of the polarizing plate 113 at the observer side which will be described below. In FIG. 11, the right side of the drawing is the observer side. The image source unit 101 according to this embodiment is a TN-type liquid crystal display panel unit.

As can be seen from FIG. 11, the image source unit 101 comprises a backlight 2, a prism sheet 3, an optical control sheet 4, a light source-side polarizing plate 106, an adhesive layer 107, a liquid crystal panel 108, an adhesive layer 109, an observer-side polarizing plate 113, an optical functional layer 114, and an anti-glare layer 109. These layers extend the back/front side of the drawing while maintaining the cross-sectional shape shown in FIG. 11. Each layer will be described below. In the drawings to be described below, some repeated reference numerals may be omitted for viewability. In the display device, other known components for a display device, such as an electric circuit and a power supply circuit for operating the image source unit 101, are comprised.

In this embodiment, the backlight 2, the prism sheet 3, the optical control sheet 4, the light source-side polarizing plate 106, the adhesive layer 107, the liquid crystal panel 108, the adhesive layer 109, and the observer-side polarizing plate 113 constitute the image source and the optical sheet is formed by the optical functional layer 114 and the anti-glare layer 19.

Since the backlight 2, the prism sheet 3, the optical control sheet 4, and the anti-glare layer 19 are the same as those of the image source unit 1 described above, the description thereof is not repeated here.

The light source-side light polarizing plate 106 and the observer-side light polarizing plate 113 are optical elements that are disposed on the light source side and the observer side of the liquid crystal panel 108, respectively. The light source-side polarizing plate 106 and the observer-side polarizing plate 113 comprise: polarizing layers 106b and 113b for polarizing light; and protection layers 106a, 106c, 113a, and 113c for protecting the polarizing layers 106b and 113b.

The polarizing layers 106b and 113b are formed of a stretched film made of the iodine-stained polyvinyl alcohol (PVA). The polarizing function of the polarizing layers 106b and 113b is due to the polarizing effect of the oriented iodine in the stretched film.

The protection layers 106a, 106c, 113a, and 113c are layers that protect the polarizing layers 106b and 113b from an external environment. Among them, the protection layers 106a, 106c, and 113a are formed of triacetylcellulose (TAC). Meanwhile, the protection layer 113c is a layer that is disposed on the observer side and is not affected by the polarization. Therefore, a PET, which has large birefringence, can be used. In this embodiment, the PET is used from a viewpoint of adhesivity with an ultraviolet curing resin used in the optical functional layer 114 to be described below and curing property.

That is, by laminating the protection layers 106a, 106c, 113a, and 113c on the surfaces of the polarizing layers 106b and 113b, the light polarizing plates 106 and 113 are formed. The protection layer 113c works as a base layer of the optical functional layer 114.

In this embodiment, since the image source unit 101 is the TN-type liquid crystal, the light source-side light polarizing plate 106 and the observer-side light polarizing plate 113 are disposed such that polarization directions thereof are orthogonal to each other, and the polarization direction of the observer-side polarizing plate 113 is the direction shown by the line X-X of FIG. 10. The polarization direction (that is, direction shown by the line B-B of FIG. 10) of the light source-side light polarizing plate 106 is orthogonal to the observer-side light polarizing plate.

The liquid crystal panel 108 is one of elements constituting the image source in the image source unit 101 and displays image output from the image source. In this embodiment, the general liquid crystal panel of the TN type is used.

The adhesive layers 107 and 109 are layers where the adhesive is disposed to adhere the light source-side polarizing plat 106 and the observer-side polarizing plate 113 to the liquid crystal panel 108. The adhesive used in the adhesive layers 107 and 109 is not limited in particular, as long as the adhesive transmits the light and has appropriate adhesivity. For example, an acrylic adhesive may be used. The adhesive force is about several N/25 mm to 20N/25 mm.

The optical functional layer 114 is a layer that is laminated on the protection layer 113c disposed on the observer side of the observer-side polarizing plate 113. The optical functional layer 114 comprises: light-transmitting portions 115, 115, . . . that have an approximately trapezoidal shape in a cross section in the sheet thickness direction taken along the line X-X of FIG. 10; and low refractive-index portions 116, 116, . . . that are disposed between the light-transmitting portions 115, 115, . . . .

The light transmitting portions 115, 115, . . . are elements having an approximately trapezoidal cross section of which the protection layer 113c side is a lower base and the other side (observer side) is an upper base. Since the other configuration of the light-transmitting portions 115 is the same as the configuration of the light-transmitting portions 13 of the optical functional layer 12 in the image source unit 1, the description thereof is not repeated here.

The low refractive-index portions 116, 116, . . . are portions that are disposed between the light-transmitting portions 115, 115, . . . . The cross-sectional shape of each of the low refractive-index portions 116, 116, . . . is an approximately trapezoidal shape in which the upper base side of the light-transmitting portions 115, 115, . . . is the longer lower base and the opposite side is the shorter upper base. Since the other configuration of the low refractive-index portions 116, 116, . . . is the same as the configuration of the low refractive-index portions 14 of the optical functional layer 12 in the image source unit 1, the description thereof is not repeated here.

The low refractive-index portions 116, 116, . . . of the optical functional layer 114 is configured such that the longitudinal direction thereof is vertical to the polarization direction of the polarizing plate 113 disposed on the observer side. Therefore, the low refractive-index portions 116, 116, . . . extend in a direction parallel to the arrow B of FIG. 10.

According to the liquid crystal display device that comprises the image source unit 1 having the above-described configuration, in addition to the advantage described in the image sourced unit 1, the advantage that the base of the optical functional layer 114 can be shared with the protection layer 113c of the observer-side polarizing plate 113 can be obtained, and thereby the layer structure can be simplified. That is, productivity can be improved. By the simplifying the layer structure, a thinner display device can be configured.

Moreover, by simplifying the layer structure, blurring of the image light can be prevented and a display device that can provide high quality image can be provided.

This image source unit 101 is manufactured, for example, as follows.

The protection layer 113c, which functions as the base material layer of the optical functional layer 114, is passed between a die roll formed to transfer a shape of the light-transmitting portion 115 and a nip roll. At this time, an ultraviolet curing resin composition for the light-transmitting portion 115 is fed and filled between the die roll and the protection layer 113c. Then, the filled composition is cured by ultraviolet rays irradiated onto the composition from the side of the protection layer 113c (base material layer), to obtain the light-transmitting portions 115.

Next, the sheet, in which the light-transmitting portions 115 are formed, is released from the die roll. Then, a binder resin in which the light absorbing particles are dispersed is supplied to the groove formed between the light-transmitting portions 115. The extra binder resin is removed by such as scrapping. Then, the binder resin filled into the groove is cured by ultraviolet rays irradiated onto the resin, to obtain the low refractive-index portion 116. Thereby, a band shaped laminate comprising the protection layer 113c functioning as the base material layer and the optical functional layer 114 is formed in a wound up roll. In the laminate, the direction to which the light-transmitting portion 115 (low refractive-index portion 116) of the optical functional layer 114 extends is the longitudinal direction of the band shape.

On the surface opposite to the protection layer 113c side surface of the optical functional layer 114 of the laminate comprising the protection layer 113c functioning as the base material layer and the optical functional layer 114, the AG layer 19 is formed by UV molding or coating. Thereby, the laminate comprising the protection layer 113c, the optical functional layer 114, and the AG layer 19 is formed in a roll shape.

Meanwhile, a PVA film is dyed by an iodine compound and the iodine compound permeates the film. The film is extended, and cross-linked by boric acid to obtain the band shaped polarization layer 113b in a roll shape. The polarization direction of the polarization layer 113b is orthogonal to the longitudinal direction of the band shape. After the obtained polarization layer 113b is cleaned, the polarization layer 113b is laminated on the protection layer 113c of the laminate comprising the protection layer 113c, the optical functional layer 114, and the AG layer 19. Thereby, the laminate comprising the polarization layer 113b, the protection layer 113c, the optical functional layer 114, and the AG layer 19 is formed. In this embodiment, the lamination is performed in a way that the above laminate and the polarization layer 113b are laminated with unwinding rolls thereof and then the obtained laminate is wound up to a roll again.

In the lamination process, the extension direction of the light-transmitting portions 115 (low refractive-index portions 116) of the optical functional layer 114 and the polarization direction of the observer-side polarizing plate 113 are adjusted to be orthogonal to each other.

Then, the protection layer 113a and the adhesive layer 109 are formed on the side opposite to the side of the polarization layer 113b. Next, the sheet is punched such that the size of the obtained laminate becomes equal to the size of the liquid crystal panel 108 (refer to XII of FIG. 12). When the sheet is punched, the extension direction of the light-transmitting portions 115 (low refractive-index portions 116) of the optical functional layer 114 is adjusted to the longitudinal direction of the panel. And the longitudinal direction of the panel and the polarization direction of the polarization layer 113b are orthogonal to each other.

In a conventional TN liquid crystal of a monitor for a personal computer or a monitor for a notebook computer, the direction of grayscale inversion direction is set to the lower side. This is because a keyboard is provided on the lower side from which a user does not view the monitor. On the other hand, in a car navigation device, in order to prevent a reflection on a front glass, an upper viewing angle needs to be narrowed and the direction of grayscale inversion is set to the upper side. In order to make TN liquid crystals such configurations, the punching of the above laminate needs to be performed obliquely relative to the longitudinal direction of the laminate so as to make the polarization direction obliquely relative to the monitor, which is wasteful.

The principle of grayscale inversion is as follows; the phase difference is generated in the light diffused by the backlight and transmitted through the polarizing plate in the oblique direction, thereby necessary image light is cut by the liquid crystal or unnecessary image light is not cut by the liquid crystal and is output.

Figure 12:
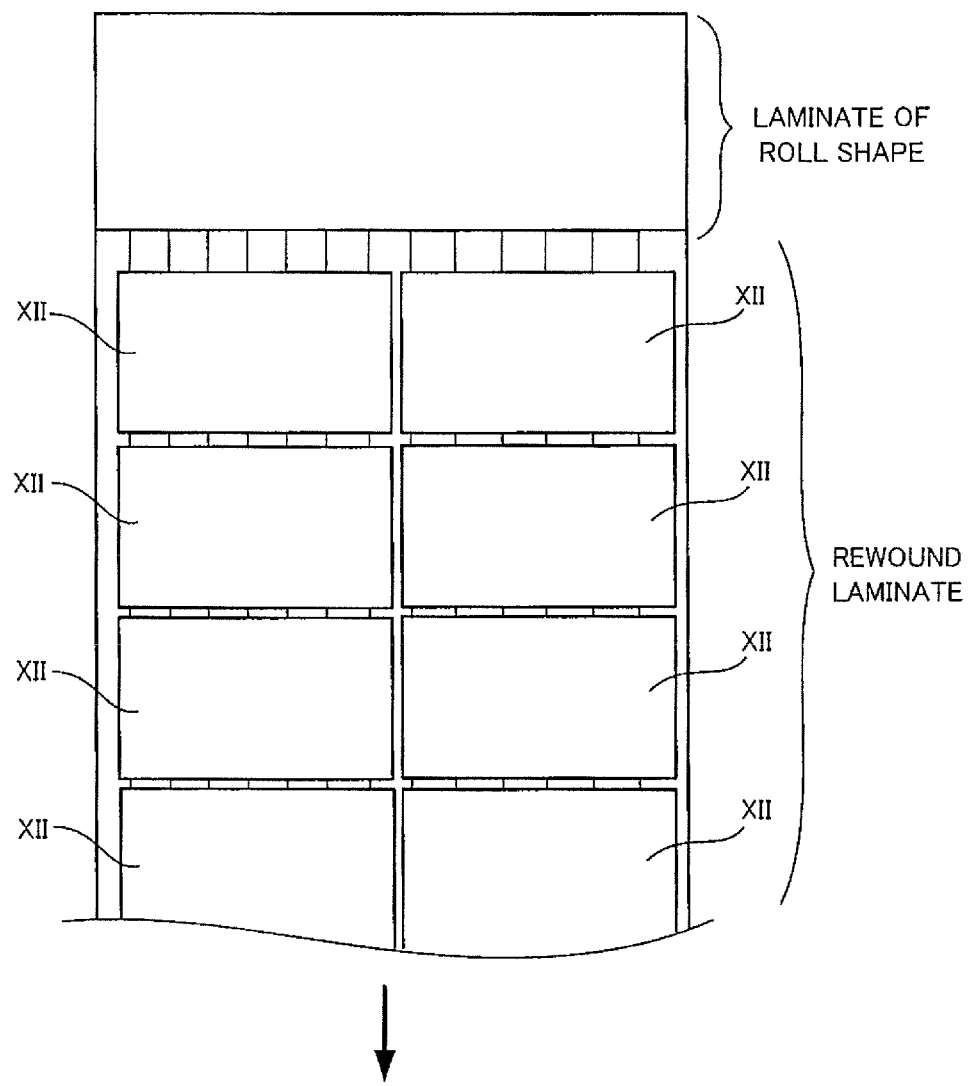
FIG. 12 is a diagram showing one process of a method of manufacturing the image source unit of the display device according to the second embodiment.

Meanwhile, in this embodiment, by adjusting the backlight to be parallel, the backlight passes through the plate surface of the polarizing plate as a light parallel to the normal direction of the plate surface. According to the above principle, since the grayscale inversion is not generated, oblique punching is not needed even in the TN liquid crystal. Thereby, as shown in FIG. 12, a rectangular sheet can be efficiently punched and thereby the waste is decreased. As a result, a display device that has high productivity and a method of manufacturing the display device can be provided.

The punched laminate is laminated on the liquid crystal panel 108. At this time, the extend direction of the light-transmitting portions 115 (low refractive-index portions 116) of the optical functional layer 114 is preferably set to be vertical to the liquid crystal panel 108 surface. Thereby, a viewing angle of the horizontal direction can be improved.

Meanwhile, the light source-side polarizing plate 106 on which the adhesive 107 is laminated is laminated on the opposite side of the liquid crystal panel 108. Finally, the optical control sheet 4 is laminated on the laminate.

Figure 13:
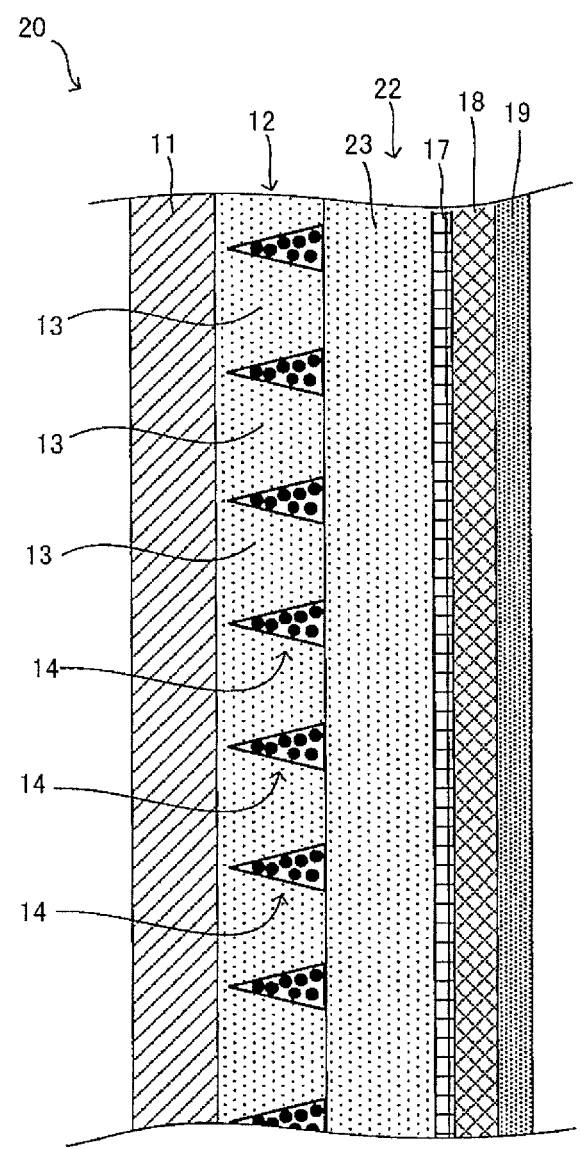
FIG. 13 is a cross-sectional view of an optical sheet provided in a display device according to a third embodiment and shows a schematic layer structure thereof.

FIG. 13 is a cross-sectional view of an optical sheet 20 provided in a display device according to a third embodiment and shows a schematic layer structure thereof. In the optical sheet 20, another optical functional layer 22 is further laminated between the optical functional layer 12 and the adhesive layer 17 of the optical sheet 10 provided in the display device according to the first embodiment. The optical functional layer 22 has the same configuration as that of the optical functional layer 12. However, the low refractive-index portions (FIG. 10 shows only the light-transmitting portions 23 and does not show the low refractive-index portions) of the optical functional layer 22 are disposed in a direction orthogonal to the low refractive-index portions 14, 14, . . . of the optical functional layer 12. According to this embodiment, by the optical sheet 20, the diffusion angle of the image light can be enlarged and the light can be diffused in a wide range.

The display device according to this embodiment comprises the image source described in the first embodiment.

Figure 14:
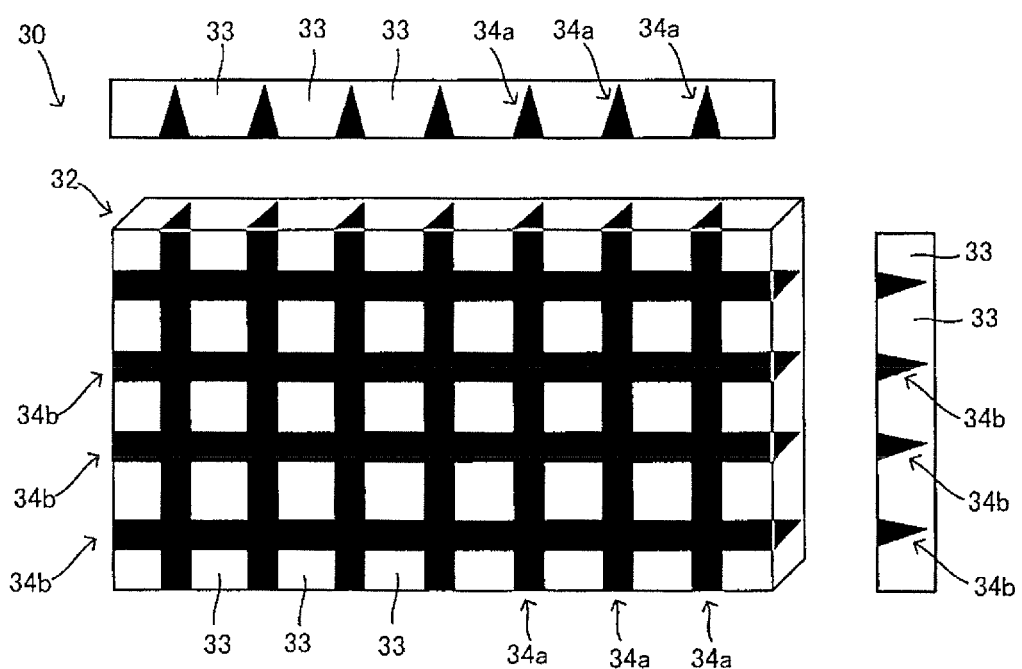
FIG. 14 is a diagram showing an optical functional layer of an optical sheet provided in a display device according to a fourth embodiment and shows a schematic layer structure thereof.

FIG. 14 is a perspective view showing a schematic structure of an optical functional layer 32 of an optical sheet 30 provided in a display device according to a fourth embodiment. In FIG. 14, not only the perspective view but also the cross-sectional views at the upper and right sides thereof are shown for viewability. Since the configuration other than the optical functional layer 32 is the same as the configuration of the optical sheet 10 provided in the display device according to the first embodiment, the description thereof is not repeated here. The display device according to this embodiment comprises the image source described in the first embodiment.

In the optical functional layer 32 shown in FIG. 14, low refractive-index portions 34*a*, 34*a*, . . . and 34*b*, 34*b*, . . . , which have triangle cross sectional shapes, are disposed in a reticular pattern in which low refractive-index portions 34*a*, 34*a*, . . . and 34*b*, 34*b*, . . . intersect each other. Regions surrounded by the lattices are light-transmitting portions 33, 33, . . . . In this embodiment, the cross section of each low refractive-index portions 34*a*, 34*a*, . . . and 34*b*, 34*b*, . . . is triangular, but it may be trapezoidal. At this time, each of the low refractive-index portions 34*a*, 34*a*, . . . and 34*b*, 34*b*, . . . is disposed such that the shorter upper base of the trapezoid is the light source side and a longer lower base thereof is the observer side. Also in the low refractive-index portions of this embodiment, the above-described equations, which is relate to the divergence angle of the image light emitted from the image source 8, are satisfied.

In the optical sheet 30 provided in the display device according to this embodiment, the low refractive-index portions are formed in a lattice shape in the optical functional layer 32. In the lattice shape, the sides of low refractive-index portions, which are formed of the low refractive-index portions 34*a*, 34*a*, . . . and 34*b*, 34*b*, . . . are disposed to cross each other at an approximately right angle. By forming the low refractive-index portions in such a way, viewing angles of horizontal and vertical directions of the optical functional layer 32 can be increased. Therefore, viewing angles can be increased in all directions while the thickness of the optical sheet is decreased. In this case, the configuration other than that the low refractive-index portions 34*a*, 34*a*, . . . and 34*b*, 34*b*, . . . are disposed in the lattice shape is the same as the configuration of the optical functional layer 12 of the optical sheet 10 described above.

Figure 15:
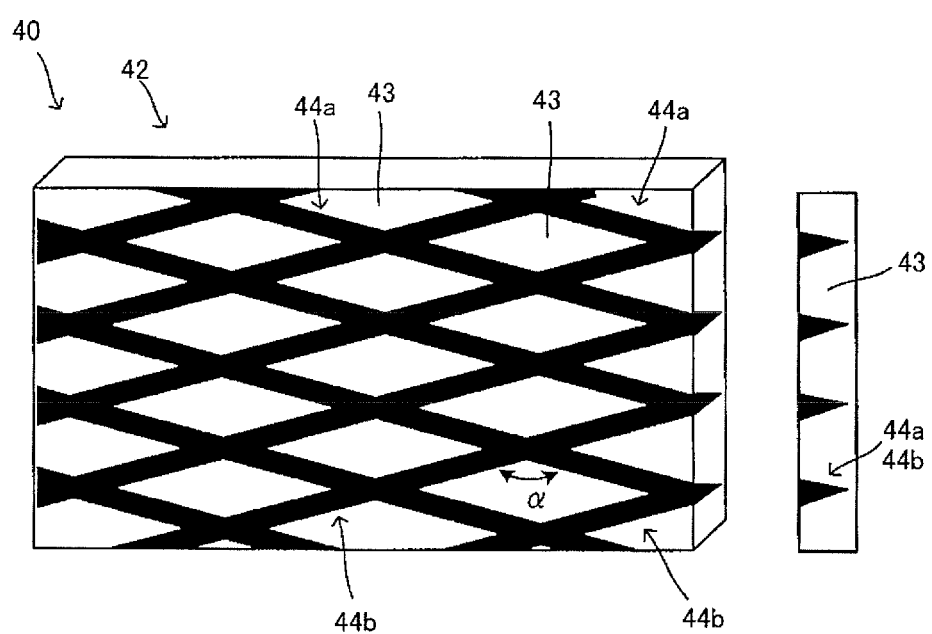
FIG. 15 is a diagram showing an optical functional layer of an optical sheet provided in a display device according to a fifth embodiment and shows a schematic configuration thereof.
Figure 16:
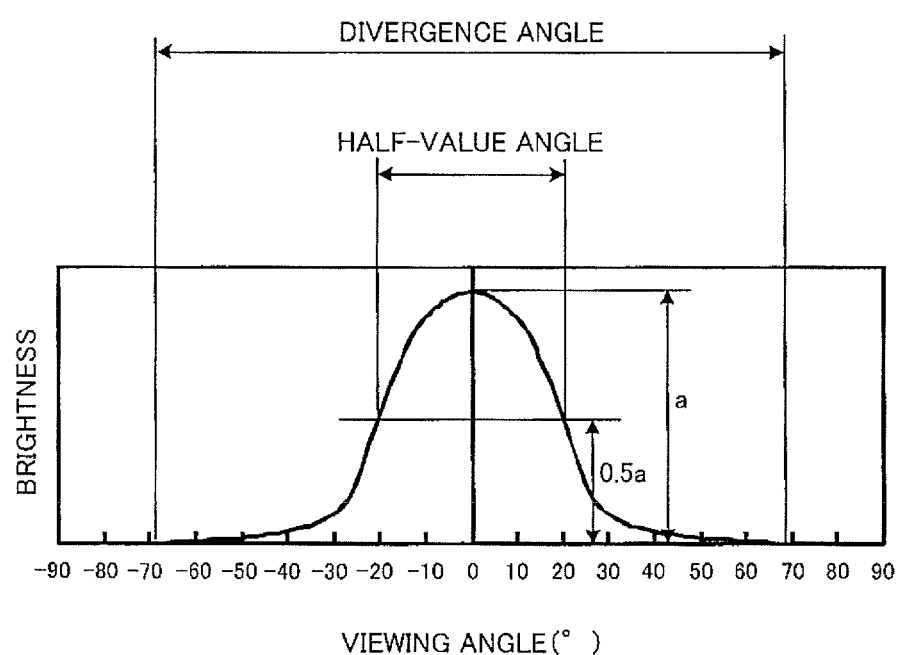
FIG. 16 is a diagram showing a divergence angle and a half-value angle of the divergence angle.

FIG. 15 is a perspective view showing a schematic structure of an optical functional layer 42 of an optical sheet 40 provided in a display device according to a fifth embodiment. In FIG. 15, not only the perspective view but also the cross-sectional views at the right side thereof are shown for viewability. Since the configuration other than the optical functional layer 42 is the same as the configuration of the optical sheet provided in the display device according to the first embodiment, the description thereof is not repeated here. The display device according to this embodiment comprises the image source described in the first embodiment.

In the optical functional layer 42 shown in FIG. 15, low refractive-index portions 44*a*, 44*a*, . . . and 44*b*, 44*b*, . . . , which have triangle cross-sectional shapes, are disposed in a reticular pattern in which low refractive-index portions 44*a*, 44*a*, . . . and 44*b*, 44*b*, . . . intersect each other at an angle of α. And regions surrounded by lattices are light-transmitting portions 43, 43, . . . . In this embodiment, the cross-sectional shape of each of the low refractive-index portions 44*a*, 44*a*, . . . and 44*b*, 44*b*, . . . is the triangle, but it may be a trapezoid. At this time, each of the low refractive-index portions 44*a*, 44*a*, . . . and 44*b*, 44*b*, . . . is disposed such that a shorter upper base of the trapezoid is the light source side and a longer lower base thereof is the observer side. Also in the low refractive-index portions of this embodiment, the above-described equations, which is relate to the divergence angle of the image light emitted from the image source 8, are satisfied.

In the optical sheet 40, the low refractive-index portions are formed in the lattice shape in the optical functional layer 42. In the lattice shape, the sides of low refractive-index portions, which are formed of the low refractive-index portions 44*a*, 44*a*, . . . and 44*b*, 44*b*, . . . , are disposed to cross each other at the angle of α. By forming the low refractive-index portions in such a way, a viewing angle corresponding to the angle α can be improved. In this case, the configuration other than that the low refractive-index portions 44*a*, 44*a*, . . . and 44*b*, 44*b*, . . . , are disposed in the lattice shape is the same as the configuration of the optical functional layer 12 of the optical sheet 10 included in the display device according to the first embodiment described above. Therefore, also in the optical sheet 40, a viewing angle can be improved in a certain direction while the thickness of the optical sheet is decreased.

EXAMPLE

As the example, the image source unit that has the layer structure shown in FIG. 2 is formed. With changing the conditions of the above equation 5, that is, with changing the refractive index $\theta_b$ of the optical functional layer and the half-value angle $\theta_0$ of the divergence angle, the light transmission efficiency at each condition is investigated. As the backlight (2), the cold cathode fluorescent lamp (CCFL) is used. As the optical control sheet (4), the sheet providing the light-transmitting portions arranged along the sheet surface is used, wherein the light-transmitting portions have the cross section of the trapezoidal shape in which the shorter upper base is the light source side and the longer lower base is the observer side. Between the light-transmitting portions of the optical control sheet (4), the low refractive-index portions having the cross section of the triangular shape are disposed, wherein the refractive index of the low refractive-index portions is lower than the refractive index of the light-transmitting portions.

Table 1 shows the refractive index $N_p$ of the light-transmitting portions of the optical functional layer, the refractive index $N_b$ of the low refractive-index portions, the angle $\theta_b$ formed by the interface between the light-transmitting portions and the low refractive-index portions and the normal line of the sheet light emission surface, and the half-value angle $\theta_0$ of the divergence angle of each example. Further, Table 1 also shows light-use efficiency. The term "light-use efficiency" means a ratio of light emitted to the observer side, when all of the light emitted from the light source is set to 1. Further, Table 1 shows a calculation value of the left side of the equation 5 and a calculation value of the right side of the equation 5 of each example.

The optical functional layers of Nos. 1 to 9 shown in Table 1 were manufactured in a manner as described below.

<Preparation of the Composition for the Light-Transmitting Portions>

13.0 parts by mass of bisphenol A—propylene oxide 2 mole adduct as a photo-curable oligomer, 8.0 parts by mass of xylylene diisocyanate, and 0.01 mass part of bismuth tri(2-ethyl hexanoate) (50% solution of 2-ethylhexanoic acid) (the same hereinafter) as an urethane-forming catalyst were mixed, and the mixture was allowed to react at 80° C. for 6 hours. Then, 2.0 parts by mass of 2-hydroxyethyl acrylate were added thereto, and the mixture was allowed to react at 80° C. for 3 hours to give an urethane acrylate oligomer. 23.0 parts by mass of thus-obtained urethane acrylate oligomer, 22.0 parts by mass of 9,9'-bis(4-hydroxyethyl)fluorene ethylene oxide-modified diacrylate as a photo-curable monomer, 55.0 parts by mass of phenoxyethyl acrylate, 0.05 mass part of tridecanol phosphoric acid ester [monoester:diester=1:1 in a molar ratio] as a mold lubricant, and 2.0 parts by mass of 1-hydroxycyclohexylphenyl ketone (tradename: IRGACURE 184, manufactured by Chiba Specialty Chemicals Co., Ltd.) as a photo-polymerization initiator, were mixed and homogenized to give the composition for the light-transmitting portions.

<Formation of the Light-Transmitting Portions>

The light-transmitting portions were formed using a die roll that provides certain shape grooves on the surface. The detail is as follows: the die roll, which provides grooves each having approximately trapezoidal cross section that extend in a circumferential direction of a cylinder and arranged in an axial direction of the cylinder, was prepared. More specifically, the die roll has plural trapezoidal shape grooves corresponding to light-transmitting portions and triangular shape portions corresponding to low-refractive portions; the width of the lower base of each trapezoidal groove is 23 μm, the pitch of the grooves is 46 μm, and the oblique angle $\theta_b$ of trapezoidal groove is varied. A PET film (A4300 manufactured by Toyobo Co., Ltd.) having a thickness of 25 μm as the base material layer was passed through between the die roll and the nip roll while the composition for the light-transmitting portions prepared in the above way was fed between the die roll and the PET. Then, the obtained sheet consisting of the pet and the composition for the light-transmitting portions was irradiated by ultraviolet rays (800 mJ/cm$^2$) from the PET side using a high-pressure mercury lamp in order to curing the composition for the light-transmitting portions. The obtained sheet was separated from the die roll to obtain a sheet (intermediate member) that includes the light-transmitting portions. The refractive index $N_p$ of the light-transmitting portion of the sheet was 1.58.

<Preparation of Composition for Low Refractive-Index Portions>

34.0 parts by mass of urethane acrylate and 14.0 parts by mass of an epoxy acrylate oligomer as a photo-polymerization component, 28.0 parts by mass of tripropylene glycol diacrylate as a photo-curable monomer, 4.0 parts by mass of methoxy triethylene glycol acrylate, 20.0 parts by mass of acrylic cross-linked particulates containing 25% carbon black having 4.0 μm average particle size (Ganz Chemical Co., Ltd.) as photo-absorption particles, and 7.0 parts by mass of 1-hydroxycyclohexylphenyl ketone (trademark: IRGACURE 184, manufactured by Chiba Specialty Chemicals Co., Ltd.) as a photo-polymerization initiator were mixed, and homogenized to give the composition constituting the low refractive index part. At this time, the refractive index ($N_b$) of the part except the photo-absorption particle (binder) was 1.49.

<Preparation of the Low Refractive-Index Portions>

The obtained composition for low refractive-index portions is supplied from the supply device on the intermediate member. The supplied composition for the low refractive-index portions is filled into the grooves of the intermediate member (grooves between the light-transmitting portions) and then the extra composition of the low refractive-index portions is scraped by using a doctor blade disposed approximately vertical to the movement direction of the intermediate member. Then, the composition for the low refractive-index portions is cured by irradiating the ultraviolet ray to obtain the low refractive-index portions. In this state, since each surface of the low refractive-index portions has a recess of 5 μm, the same filling and scraping processing is executed again to decreasing the depth of the recess to 2 μm.

On the surface of the optical functional layer formed in the above-described way that is opposite to the base material layer, the AG layer is formed by UV molding or coating. Thereby, the laminate comprising the base material layer, the optical functional layer, and the AG layer is formed in a roll shape.

Next, a PVA film is dyed by an iodine compound and the iodine compound permeates the film. The film is extended, and cross-linked by boric acid to obtain the band shaped polarization layer which is formed in a roll shape. At this time, the polarization direction of the polarization layer is adjusted to the direction that is orthogonal to the longitudinal direction of the band shape. After the obtained polarization layer is cleaned, the polarization layer is laminated on the base material layer of the laminate comprising the base material layer, the optical functional layer, and the AG layer, by the adhesive. Thereby, the laminate comprising the polarization layer, the base material layer, the optical functional layer, and the AG layer is formed. In this example, the lamination is performed in a way that the above laminate, which comprises the base material layer, the optical functional layer, and the AG layer, and the polarization layer 113b are laminated with unwinding rolls thereof and then the obtained laminate is wound up to a roll again.

The laminates No. 10 to No. 12 shown in Table 1 are formed in the same manner as above without changing the composition ratio of material; the refractive index of the composition for light-transmitting portions is adjusted to 1.60 and the composition for low refractive-index portions is adjusted to 1.48.

TABLE 1

| | $N_p$ | $N_b$ | Left side of Equation (5) Calculation value | $\theta_b$ Degree | $\theta_o$ Degree | Right side of Equation (5) Calculation value | Light-use efficiency | Note |
|---|---|---|---|---|---|---|---|---|
| 1 | 1.58 | 1.49 | 70.56 | 9.0 | 10 | 74.33 | 0.85 | Example |
| 2 | 1.58 | 1.49 | 70.56 | 9.0 | 20 | 67.65 | 0.5 | Comparative example |
| 3 | 1.58 | 1.49 | 70.56 | 9.0 | 30 | 61.37 | 0.3 | Comparative example |
| 4 | 1.58 | 1.49 | 70.56 | 5.0 | 10 | 78.33 | 0.92 | Example |
| 5 | 1.58 | 1.49 | 70.56 | 5.0 | 20 | 71.65 | 0.65 | Example |
| 6 | 1.58 | 1.49 | 70.56 | 5.0 | 30 | 65.37 | 0.41 | Comparative example |
| 7 | 1.58 | 1.49 | 70.56 | 15.0 | 10 | 68.33 | 0.46 | Comparative example |
| 8 | 1.58 | 1.49 | 70.56 | 15.0 | 20 | 61.65 | 0.23 | Comparative example |
| 9 | 1.58 | 1.49 | 70.56 | 15.0 | 30 | 55.37 | 0.14 | Comparative example |
| 10 | 1.60 | 1.48 | 67.69 | 10.0 | 10 | 73.42 | 0.89 | Example |
| 11 | 1.60 | 1.48 | 67.69 | 10.0 | 20 | 66.85 | 0.58 | Comparative example |
| 12 | 1.60 | 1.48 | 67.69 | 10.0 | 30 | 60.66 | 0.36 | Comparative example |

As can be seen from Table 1, the laminates satisfying the equation 5 have the light-use efficiency value of 0.6 or more, that is, show the high light-use efficiency. Meanwhile, the laminates not satisfying the equation 5 have the light-use efficiency value of smaller than 0.6, that is, show the low light-use efficiency.

What is claimed is:

1. An image source unit comprising: an image source outputting an image; and an optical sheet disposed closer to an observer than the image source and having a plurality of layers to control light from the image source and transmit the light to the observer side, wherein the optical sheet comprises an optical functional layer comprising: a light-transmitting portion having a trapezoidal cross section, having a refractive index of $N_p$ and being arranged along a sheet face to transmit the light; and a low refractive-index portion having a wedge shape cross section, having a refractive index of $N_b$, and being arranged between the light-transmitting portions, and an oblique side of the wedge shape cross section of the low refractive-index portion forms an angle of $\theta_b$ with respect to a normal line of the sheet face, and when a half-value angle of a divergence angle of image light from the image source is set to $\theta_0$ and a refractive index of air is set to $N_0$, $N_p > N_b$ and the following equation are satisfied.

$$\sin^{-1}\frac{N_b}{N_p} \leq 90° - \left\{\sin^{-1}\left(\frac{N_0}{N_p} \cdot \sin\theta_0\right) + \theta_b\right\}$$

2. The image source unit according to claim 1, wherein the low refractive-index portions can absorb light.

3. The image source unit according to claim 2, wherein a binder that is made of a resin having a refractive index of $N_b$ is filled into the low refractive-index portion, and light absorbing particles that have an average particle size of 1 μm or more are dispersed in the binder.

4. The image source unit according to claim 1, wherein the image source comprising: a light source; a light source-side polarizing plate disposed on a light emission side of the light source; a liquid crystal panel disposed on the observer side of the light source-side polarizing plate; and an observer-side polarizing plate disposed on the observer side of the liquid crystal panel, the observer-side polarizing plate comprising: a polarization layer; and protective layers arranged to sandwich the polarization layer, the optical functional layer of the optical sheet is laminated directly on a observer side surface of the protective layer of the observer-side polarizing plate, and the light-transmitting portions and the low refractive-index portions of the optical functional layer extend while maintaining the cross-sectional shape thereof, and an extension direction and a polarization direction of the observer-side polarizing plate are vertical to each other.

5. The image source unit according to claim 1, wherein the cross-sectional shape of the light-transmitting portions and the cross-sectional shape of the low refractive-index portion of the optical functional layer are approximately trapezoidal, and shorter upper bases of the light-transmitting portions and longer lower bases of the low refractive-index portions are directed to the observer side.

6. The image source unit according to claim 1, wherein the light-transmitting portion of the optical functional layer is formed of a composition that contains acrylate having a fluorene backbone.

7. The image source unit according to claim 1, wherein the difference between the refractive indices of the light-transmitting portion and the low refractive-index portion of the optical functional layer is 0.09 or more.

8. The image source unit according to claim 1, wherein the light-transmitting portion and the low refractive-index portion of the optical functional layer are formed to extend in a longitudinal direction while maintaining the cross sections thereof, the optical functional layer is formed by laminating two layers, and the two optical function layers are laminated such that a longitudinal direction of the low refractive-index portion of one optical functional layer and a longitudinal direction of the low refractive-index portion of the other optical functional layer form a certain angle.

9. The image source unit according to claim 8, wherein the certain angle is 90 degrees.

10. The image source unit according to claim 1, wherein the low refractive-index portions of the optical functional layer are formed in a lattice shape to cross each other at a certain angle.

11. The image source unit according to claim 10, wherein the certain angle is 90 degrees.

12. A display device comprising the image source unit according to claim 1.

13. A method of manufacturing the image source unit according to claim 4, comprising:
- a process for forming the optical functional layer on the protective layer of the observer-side polarizing plate.

* * * * *